United States Patent Office 2,767,164
Patented Oct. 16, 1956

2,767,164

COMPLEXES CONTAINING PHOSPORUS AND SULPHUR AND METHODS OF MAKING SAME

Peter A. Asseff, Cleveland, Thomas W. Mastin, Willoughby, and Alan Rhodes, Euclid, Ohio, assignors to The Lubrizol Corporation, Wickliffe, Ohio, a corporation of Ohio No Drawing. Application November 3, 1952,
Serial No. 318,526

14 Claims. (Cl. 260—139)

This invention relates to new compositions of matter, and more particularly pertains to novel organic salt complexes and novel methods of producing same.

It is now well known that when preparing a salt or soap of an organic acid, the mere use of an excess of neutralizing agent, which in the prior art has been in the form of an oxide, hydroxide, carbonate, etc. of a desired metal, results in a product which contains an amount of metal in excess of that theoretically required to replace the acidic hydrogens of the organic acid used as a starting material.

An object of the present invention is to provide novel salt complexes. Another object of the present invention is to provide new methods of producing novel salt complexes. A further object of the present invention is to provide novel salt complexes which are especially adapted for use in lubricants. Other objects or advantages of this invention will be apparent from the following explanation and description thereof.

Essentially the present invention comprises novel salt complexes formed with an oil-soluble acidic organic compound and/or the salt thereof; a material which is hereinafter referred to as the promoter; salts or bases; and water.

Another aspect of the present invention involves salt complexes comprising an oil-soluble salt of an acidic organic compound having in complex formation therewith a salt or base, and said complex contains a higher salt forming radical content than is heretofore known.

Still another aspect of the present invention is to treat the salt complexes mentioned above with a material which will possess acid characteristics in the process mass so as to adjust the alkalinity of the salt complex and/or to partially or substantially completely recover the promoter in the ionizable form.

More particularly, the present invention is concerned with salt complexes prepared by the process which comprises preparing and mixing a mass in which, at 50° C., at least 50% of the components are in the liquid state, and in which mass the active components consist of:

A. A mixture of:
   (i) At least one oil-soluble organic acid compound having at least 12 carbon atoms in the molecule selected from the class consisting of aliphatic and cyclic sulphur acids and the salts thereof; and
   (ii) At least one oil-soluble organic acid compound having at least 12 carbon atoms in the molecule selected from the class consisting of the aliphatic and cyclic phosphorus acids and the salts thereof; the ratio of equivalents of (i) to (ii) being from 0.10 to 10;

B. An organic compound selected from the class consisting of organic salt-forming compounds and the salts thereof, said organic compounds having—
   (i) An ionization constant in water of at least about $1 \times 10^{-10}$ at about 25° C.;
   (ii) A water solubility at 50° C. of at least about 0.0005%; and
   (iii) In saturated aqueous solutions at about 25° C. a pH of less than 7;
the relative total amount of A and B used being in the range of from about one equivalent of the total amount of A to about 10 equivalents of B to about 10 equivalents of the total amount of A to about one equivalent of B;

C. A basically reacting metal compound;
   (i) Which is water-soluble at a temperature of 50° C. to the extent of at least about 0.0003%;
   (ii) In an amount such that there are present in the mass substantially more than 1 equivalent of metal, including the metal present in the remaining components, per equivalent of A plus B; and D. Water, in an amount equal to at least about one-tenth mole per mole of C;

maintaining the mass at a temperature and for a period of time sufficient to drive off substantially all free water and water of hydration which may be present, and form the organic metal complex.

Optionally, the above salt complex can be further modified by: Treating the mass with sufficient amounts of a material which in the presence of the mass will form a material having a higther ionization constant than the organic salt-forming compound of component B, to liberate a substantial portion of said organic compound of component B.

If desired, the abve salt complexes prepared in accordance with the above optional step can then undergo treatment to remove from the mass so much of the organic salt-forming compound of component B as may have been formed by said step.

This application is a continuation-in-part of our copending application, Serial No. 216,101, filed March 16, 1951, and is a continuation-in-part also of our related copending applications, Serial No. 216,102 now U. S. Patent 2,617,049; Serial No. 216,103 now U. S. Patent 2,616,924; Serial No. 224,458 now U. S. Patent 2,695,910; Serial No. 263,961 now U. S. Patent 2,616,925; Serial No. 263,926 now U. S. Patent 2,616,911; Serial No. 263,963 now now U. S. Patent 2,616,904; Serial No. 276,461 now abandoned; Serial No. 276,462 now U. S. Patent 2,616,905; and Serial No. 318,521 now U. S. Patent 2,723,234.

In our aforesaid parent application Serial No. 216,101 there is disclosed the process of producing certain novel organic salt complexes and the novel products resulting from such processes. The present invention is a refinement within the teaching of said parent case in that it relates to the processes disclosed in said parent application producing novel complexes which have unexpectedly good characteristics and which complexes are characterized by the inclusion therein of the anions of both an oil-soluble high molecular weight organic sulphur acid and an oil-soluble high molecular weight organic acid of phosphorus.

The utilization of a plurality of different anions leads to advantages not only in the production of products which have properties which cannot be achieved by the use of a single anion but also makes possible the production of complexes in certain respects like those produced by the process of said parent case at considerable savings and cost. In the more specific embodiment of this invention the different anions referred to above are respectively derived from oil-soluble high molecular weight sulphonic acids and oil-soluble high molecular weight acids of pentavalent phosphorus. A list of various classes, subclasses, and specific examples of acid compounds from which may be derived the anions of the sulphur acids useful in this process may be found in copending application, Serial No. 216,101 at page 15, line 33 thereof, through page 16, line 18.

From the broad class of available sulfur acid compounds, it is preferred to employ the oil-soluble organic sulphonic acid compounds. Furthermore, of the available metal salts of organic acids, the metal salts of groups I and II of the Mendeleef periodic table are preferred for the reason that unexpectedly excellent results are obtained by the use thereof. These oil-soluble sulphonic acids, and the metal salts thereof can be represented by the following structural formulae:

I.   $[R_x\text{—}T\text{—}(SO_3)_y]_zM_b$
II.  $[R'\text{—}(SO_3)_a]_dM_c$

In the above formulae M is a metal, preferably selected from groups I and II of the Mendeleef periodic table; T is a cyclic nucleus either of the mono- or poly-nuclear type including benzenoid or heterocyclic nuclei such as benzene, naphthalene, anthracene, phenanthrene, diphenylene, thianthrene, phenothioxine, diphenylene sulphide, diphenylene oxide, diphenyl oxide, diphenyl sulphide, diphenyl amine, etc.; R is an aliphatic group such as alkyl, alkenyl, alkoxy, alkoxy-alkyl, carboalkoxy-alkyl, or aralkyl groups, $x$ is at least 1, and $R_x$ containing a total of at least about 15 to 18 carbon atoms; $R'$ in Formula II is an aliphatic radical containing a total of at least about 15 to 18 carbon atoms, and M is a metal, preferably selected from groups I and II of the Mendeleef periodic table. When R' is an aliphatic substituted cycloaliphatic group, the aliphatic substituent should contain a total of at least about 12 carbon atoms. Examples of types of the R' radical are alkyl, alkenyl, and alkoxy-alkyl radicals, and aliphatic substituted cycloaliphatic radicals where the aliphatic group is alkyl, alkoxy, alkoxy-alkyl, carboalkoxyalkyl, etc. Specific examples of R' are cetyl-cyclohexyl, lauryl-cyclohexyl, ceryloxyethyl, and octa-decenyl radicals, and radicals derived from petrolatum, saturated and unsaturated paraffin wax, poly olefins, including poly-$C_3$, $C_4$, $C_5$, $C_6$, $C_7$, $C_8$, olefin hydrocarbons. The groups T, R and R' in the above formulae can also contain other organic or inorganic substituents in addition to those enumerated above, such as for example, hydroxy, mercapto, halogen, nitro, amino, nitraso, carboxy, ester, etc.

In Formula I above $x$, $y$, $z$ and $b$ are at least one; whereas in Formula II, $a$, $d$, and $c$ are at least one.

The following are specific examples of oil-soluble sulphonic acids coming within Formulae I and II above, and it is to be understood that such examples serve to also illustrate the metal salts of the sulphonic acids. In other words, for every sulphonic acid, it is intended that the metal salt thereof is also illustrated.

The metal salts include the mono or polyvalent metals, such as the light or heavy metals, or the metals of group I having an atomic weight less than 40 and the metals of group II having an atomic weight less than 138, such as sodium, lithium, potassium, calcium, barium, strontium, magnesium, and other specific examples, are zinc, cadmium, mercury, lead, tin, iron, cobalt, copper, manganese, aluminum, chromium, nickel, etc.

Illustrations of sulphonic acids contemplated for use as the sulphur acid in the process of this invention are contained in copending application, Serial No. 216,101 at page 13, line 9 thereof, through page 15, line 28.

It has been found that metal complexes of considerable utility may be produced when using as the starting material a mixture of at least two different sulfonic acid compounds.

Highly useful in this respect are mixtures containing (a) at least one petroleum derived sulfonic acid compound, and (b) at least one alkyl-aromatic sulfonic acid compound. Particularly preferred are mixtures of mahogany sulfonic acids or salts with alkyl-benzene sulfonic acids or salts. The ratio of equivalents of a/b is preferably between 0.1 and 10.

The following examples illustrate a number of specific combinations of different sulfonic acid compounds which may be used as starting materials for the production of our metal complexes. In each instance, the corresponding salts of the sulfonic acids are also contemplated.

| Mixture No. | Components | chemical equivalents |
|---|---|---|
| 1 | mahogany sulfonic acid | 1.0 |
|   | di-isododecyl benzene sulfonic acid | 1.0 |
| 2 | white oil sulfonic acid | 1.0 |
|   | mahogany sulfonic acid | 1.0 |
|   | di-isododecyl benzene sulfonic acid | 2.0 |
| 3 | white oil sulfonic acid | 1.0 |
|   | di-isododecyl benzene sulfonic acid | 2.0 |
| 4 | mahogany sulfonic acid | 10.0 |
|   | wax-substituted phenol sulfonic acid | 1.0 |
| 5 | mahogany sulfonic acid | 5.0 |
|   | wax-substituted naphthalene sulfonic acid | 1.0 |
| 6 | mahogany sulfonic acid | 1.0 |
|   | wax-substituted benzene sulfonic acid | 9.0 |
| 7 | petrolatum sulfonic acid | 1.0 |
|   | white oil sulfonic acid | 2.0 |
| 8 | mahogany sulfonic acid | 1.0 |
|   | petrolatum sulfonic acid | 1.0 |
| 9 | mahogany sulfonic acid | 1.0 |
|   | white oil sulfonic acid | 1.0 |
| 10 | polybutene sulfonic acid | 1.0 |
|   | mahogany sulfonic acid | 5.0 |
| 11 | wax sulfonic acid | 1.0 |
|   | mahogany sulfonic acid | 2.0 |
| 12 | eicosyl diphenyl ether sulfonic acid | 1.0 |
|   | mahogany sulfonic acid | 7.0 |
| 13 | tri-capryl diphenyl ether sulfonic acid | 1.0 |
|   | mahogany sulfonic acid | 2.5 |
| 14 | bis-(diisobutyl)-phenol sulfonic acid | 1.0 |
|   | white oil sulfonic acid | 3.0 |
| 15 | cetyl-chlorobenzene sulfonic acid | 1.0 |
|   | mahogany sulfonic acid | 8.0 |
| 16 | di-cetyl naphthalene sulfonic acid | 10.0 |
|   | mahogany sulfonic acid | 1.0 |
| 17 | white oil sulfonic acid | 2.0 |
|   | di-lauryl diphenyl ether sulfonic acid | 1.0 |
|   | di-isononyl benzene sulfonic acid | 1.0 |
| 18 | white oil disulfonic acid | 1.0 |
|   | di-isooctadecyl benzene sulfonic acid | 2.0 |
| 19 | petroleum naphthene sulfonic acids | 1.0 |
|   | mahogany sulfonic acid | 1.0 |
|   | polybutene-substituted benzene sulfonic acid | 1.0 |
| 20 | di-keryl benzene sulfonic acid | 2.0 |
|   | mahogany sulfonic acid | 1.0 |
| 21 | fuel oil substituted benzene sulfonic acid | 1.5 |
|   | mahogany sulfonic acid | 1.0 |
| 22 | stearyl naphthalene sulfonic acid | 3.0 |
|   | white oil sulfonic acid | 1.0 |
| 23 | wax-substituted phenothioxine sulfonic acid | 1.0 |
|   | mahogany sulfonic acid | 3.5 |

The phosphorus acids useful in preparing our metal complexes include tri- and pentavalent organic phosphorus acids and the corresponding thio-acids, which are, for example, phosphorus, phosphoric, thiophosphoric, thiophosphorous, phosphinic, phosphonic, thiophosphinic, thiophosphonic, etc. acids.

Among the useful phosphorus acids are those represented by the following formulae:

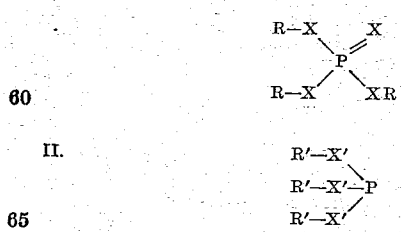

wherein X and X' are either oxygen or sulfur and R and R' are each either the same or different organic radicals or hydrogen, and wherein at least one is an organic radical and at least one R is hydrogen and wherein at least one R' is an organic radical and at least one R is hydrogen. Therefore, such formulae include the oil-soluble acid-esters of the inorganic oxy-acids and the inorganic thio-acids of phosphorus, more particularly the organic thiophosphoric acids and the organic thiophosphorous acids. The organic radicals R and R' can be aliphatic, cycloaliphatic, aromatic, aliphatic- and cycloaliphatic-substituted aromatic, etc. The organic radicals R and R' preferably contain a total of at least about 12 carbon atoms in each of the above acid types I and II. Examples of such acids are di-lauryl phosphoric acid, di-wax phosphoric acid, dicapryl dithiosphosphoric acids, di-(methyl-cyclohexyl) dithiophosphoric acids, di-lauryl dithiophosphoric acids, dicapryl dithiophosphorous acids, di-(methyl-cyclohexyl) dithiophosphorous acids, lauryl monothiophosphoric acids, di-(butyl-phenyl) dithiophosphoric acids, and mixtures of two or more of the foregoing acids. Additional examples of phosphorus acids of types I and II are given herein below. For each acid, the corresponding metallic salts of the light and heavy metals; e. g., sodium, lithium, potassium, calcium, barium, strontium, magnesium, zinc, copper, tin, lead, and aluminum, etc., are also contemplated. Particularly preferred are the alkali and alkaline earth metal salts, with a special preference for the barium salts.

Phosphoric acids:
- Dihexyl phosphoric acid
- Dioctyl phosphoric acid
- Didecyl phosphoric acid
- Diundecyl phosphoric acid
- Didodecyl phosphoric acid
- Dioctadecyl phosphoric acid
- Dihexenyl phosphoric acid
- Dioctenyl thiophosphoric acid
- Didecenyl phosphoric acid
- Dioctadecenyl phosphoric acid
- Dicyclopentyl phosphoric acid
- Dicyclohexyl phosphoric acid
- Di-(methylcyclohexyl) phosphoric acid
- Dicyclopentenyl phosphoric acid
- Dicyclohexenyl phosphoric acid
- Di-(methyl-cyclohexenyl) phosphoric acid
- Di-(phenylbutyl) phosphoric acid
- Di-(naphthylethyl) phosphoric acid
- Di-(chlorophenyloctyl) phosphoric acid
- Di-(propylphenyl) phosphoric acid
- Di-(methyl-naphthyl) phosphoric acid
- Methyl decyl phosphoric acid
- Ethyl dodecyl phosphoric acid
- Ethyl methylcyclohexyl phosphoric acid Mono- and di-esters of thiophosphoric acid, e. g.:
- O,O-di-n-hexyl thiolthionophosphate
- O,O,di-n-hexyl thionophosphate
- O,O-di-(4-methyl-sec-amyl) thiolthionophosphate
- O,S-di-n-heptyl dithiolthionophosphate
- O,O-di-(2-ethyl-hexyl) thiolthionophosphate
- O,O-di-capryl thiolthionophosphate
- O,O-di-(2,4,4-trimethyl-amyl) thiolthionophosphate
- O,S-di-n-nonyl dithiolphosphate
- O,O-di(3,5,5-trimethyl-hexyl) thiolthionophosphate
- O,O-di-n-decyl thiolthionophosphate
- S,S-di-n-undecyl dithiolphosphate
- O,O-di-lauryl thiolthionophosphate
- S-cetyl dithiolphosphate
- O,O-di-cetyl thiolthionophosphate
- Thiolthionophosphates of the general formula $(C_nH_{2n-1}O)_2PSSH$, where $n$ is a number of from 20 to 50, e. g.:
  - O,O-di-(paraffin wax) thiolthionophosphates
  - O,O-di-myricyl thiolthionophosphate
  - O,O-di-carnaubyl thiolthionophosphate
- O,O-di-(tert-amyl-phenyl) thiolthionophosphates
- O,O-bis-(diisobutyl-phenyl) thiolthionophosphates
- O,O-di-(decyl-phenyl) thionophosphates
- O-cetyl-phenyl-O-naphthyl thiolthionophosphates
- O,O-di-(methyl-cyclohexyl) thiolthionophosphates
- O,O-di-(amyl-cyclohexyl) thiolthionophosphates
- Pentacosyl-cyclohexyl tetrathiophosphates
- O,S-di-(heptyl-cyclohexyl) dithiolthionophosphate Particularly preferred are the di-(organo) dithiophosphoric acids, e. g.:
- Dihexyl dithiophosphoric acid
- Diheptyl dithiophosphoric acid
- Dioctyl dithiophosphoric acid
- Dinonyl dithiophosphoric acid
- Didecyl dithiophosphoric acid
- Didodecyl dithiophosphoric acid
- Ditetradecyl dithiophosphoric acid
- Dihexadecyl dithiophosphoric acid
- Dioctadecyl dithiophosphoric acid
- Di-(paraffin wax) dithiophosphoric acid
- Dieicosyl dithiophosphoric acid
- Dipentenyl dithiophosphoric acid
- Dioctenyl dithiophosphoric acid
- Didecenyl dithiophosphoric acid
- Dihexadecenyl dithiophosphoric acid
- Di-(methyl-benzyl) dithiophosphoric acid
- Di-(octylbenzyl) dithiophosphoric acid
- Di-(phenyloctadecyl) dithiophosphoric acid
- Di-(xenylhexyl) dithiophosphoric acid
- Di-(phenoxyoctyl) dithiophosphoric acid
- Di-(butoxy-ethyl) dithiophosphoric acid
- Bis-(3,5-dichloro-n-octyl) dithiophosphoric acid
- Bis-(2,6-dibromo-n-decyl) dithiophosphoric acid
- Dicyclopentyl dithiophosphoric acid
- Bis-(dimethylcyclopentyl) dithiophosphoric acid
- Dicyclohexyl dithiophosphoric acid
- Di-(methyl-cyclohexyl) dithiophosphoric acid
- Di-(isopropylcyclohexyl) dithiophosphoric acid
- Bis-(diisobutylcyclohexyl) dithiophosphoric acid
- Dinaphthenyl dithiophosphoric acid
- Di-(hydroabietyl) dithiophosphoric acid
- Dicyclopentenyl dithiophosphoric acid
- Di-(methylcyclohexenyl) dithiophosphoric acid
- Diabeityl dithiophosphoric acid
- Di-(tert-amyl-phenyl) dithiophosphoric acid
- Di-(2,4-di-tert-amyl-phenyl) dithiophosphoric acid
- Di-(paraffin wax-phenyl) dithiophosphoric acid
- Di-(lauroxyphenyl) dithiophosphoric acid
- Di-(caprylxenyl) dithiophosphoric acid
- Methyl octadecyl dithiophosphoric acid Partial esters of pyrophosphoric acid:
- Mono-, di-, and tri-eicosyl pyrophosphates
- Mono-, di-, and tri-(ceryl-phenyl) pyrophosphate
- Mono-, di-, and tri-(cetyl-cyclohexyl) pyrophosphates Partial esters of pyrophosphorous acid:
- Mono-, di-, and tri-octadecyl pyrophosphites
- Mono-, di-, and tri-(myricyl-phenyl) pyrophosphites
- Mono-, di-, and tri-(cetyl-cyclopentyl) pyrophosphites Partial esters of polyphosphoric acid, e. g.:
- Mono-, di-, tri-, and tetra-ceryl triphosphates
- Mono-, di-, tri-, tetra-, and penta-(di-lauryl phenyl) tetraphosphates
- Mono-, di-, tri-, tetra-, and penta-, and hexa(docosyl-cyclohexyl) pentaphosphates Partial esters of polyphosphorous acids, e. g.:
- Mono-, di-, tri-, and tetra-ceryl triphosphites
- Mono-, di-, tri-, tetra-, and penta-(stearyl-phenyl) tetraphosphites
- Mono-, di-, tri-, tetra-, penta-, and hexa(paraffin wax substituted cyclohexyl) pentaphosphites Partial esters of pyrothiophosphoric acids, e. g.:
- Mono-, di-, and tri-eicosyl pyrodithionophosphate
- Mono-, di-, and tri-(cetyl-naphthyl) pyroheptathiophosphates
- Mono-, di-, and tri-(hydroabietyl) pyrothionophates Partial esters of pyrothiophosphorous acids, e. g.:

Mono-, di-, and tri-ceryl S-pyro thiophosphites
Mono-, di-, and tri-(docosyl-phenyl) O-pyrotetrathiolphosphites
Mono-, di-, and tri-(lauryl-cyclohexyl) pyropentathiophosphites Partial esters of thiopolyphosphoric acids, e. g.:
  Mono-, di-, tri-, and tetra-ceryl decathiotriphosphates
  Mono-, di-, tri-, tetra-, and penta-(di-capryl-phenyl) tetrathionotetraphosphates
  Mono-, di-, tri-, tetra-, penta-, and hexahydroabietyl pentathionopentaphosphates Partial esters of thiopolyphosphorous acids, e. g.:
  Mono-, di-, tri-, and tetra-myricyl heptathiotriphosphites
  Mono-, di-, tri-, tetra-, and penta-(lauryl-phenyl) trithiotetraphosphites
  Mono-, di-, tri-, tetra-, penta-, and hexa(petroleum naphthenyl) tetrathiopentaphosphites Also useful in the production of the metal complexes of the present invention are the organic phosphorus acids which contain at least one carbon-to-phosphorus bond; i. e., those acids of the general formula:

III.
$$R_nP\underset{(X'H)_{3-n}}{\overset{X_m}{\diagup}}$$

wherein X and X' are oxygen or sulfur, R is an organic radical bonded to phosphorus through a carbon atom, $n$ is 1 or 2, and $m$ is 0 or 1.

Other carbon-to-phosphorus bonded organic acids of phosphorus useful in the production of our metal complexes, but whose exact structures have not yet been ascertained, may be prepared by the treatment of aliphatic and/or aromatic hydrocarbons with at least one sulfurizing and phosphorizing reagent such as $PSCl_3$, $P_2S_5$, $P_4S_7$, $P_2S_5$ plus sulfur, $PCl_3$ plus sulfur, and the like, and optionally treating thereafter with a hydrolyzing agent such as water, steam, and/or metallic base. The preparation of such materials is disclosed in U. S. Patents Nos. 2,316,085; 2,316,086; 2,316,087; 2,316,088; 2,316,089; 2,316,091; 2,316,078; 2,316,079; 2,316,080; 2,316,081; 2,316,082; 2,316,083; 2,316,084; and 2,367,468.

Specific examples of organic acids of phosphorus containing at least one carbon-to-phosphorus linkage are given hereinbelow. These examples include both acids of known structures; i. e., those of type III above, and acids whose structures have not been clearly established; e. g., the types of materials discussed in the previous paragraph.

For each acid, the corresponding metallic salts of the light and heavy metals; e. g., sodium, lithium, potassium, calcium, barium, strontium, magnesium, zinc, copper, tin, lead, and aluminum, etc., are also contemplated. Particularly preferred are the alkali and alkaline earth metal salts, with a special preference for the barium salts.

Acids of the general formula $RPX(X'H)_2$, wherein R is an organic radical bonded to phosphorus through a carbon atom and X and X' are O or S for example:

Phosphonic acids, e. g:
  N-Hexyl phosphonic acid
  N-Octyl phosphonic acid
  Capryl phosphonic acid
  Decyl-2-phosphonic acid
  Lauryl phosphonic acid
  Cetyl phosphonic acid
  Chloro-cetyl phosphonic acid
  Paraffin wax phosphonic acid
  Cyclohexyl phosphonic acid
  Methyl-cyclohexyl phosphonic acid
  Ethyl-chlorocyclohexyl phosphonic acid
  Petroleum naphthenyl phosphonic acid
  Tertiary-amyl-phenyl phosphonic acid
  Diisobutyl-phenyl phosphonic acid
  Tertiary-butyl-nitrophenyl phosphonic acid
  Wax-phenyl phosphonic acid
  Alpha-methyl-naphthyl phosphonic acid
  Cetyl-bromophenyl phosphonic acid
  Phosphonic acids derived from polybutenes of molecular weight range 400–10,000

Thiophosphonic acids, e. g.:
  N-Hexyl thionophosphonic acid
  N-Heptyl thiolthionophosphonic acid
  Lauryl trithiophosphonic acid
  Paraffin wax thionophosphonic acid
  Diisobutyl-cyclohexyl thiolphosphonic acid
  Tertiary-amyl-phenyl thionophosphonic acid
  Diisobutyl-phenyl thionophosphonic acid
  Tertiary-butyl-nitrophenyl thionophosphonic acid
  Alpha-methyl-naphthyl thionophosphonic acid
  Thiophosphonic acids derived from polybutenes of molecular weight range 400–10,000

Acids of the general formula $$\underset{R_2}{\overset{R_1}{\diagdown}}PX(X'H)$$

wherein $R_1$ and $R_2$ are the same or different organic radicals bonded to phosphorus through a carbon atom and X and X' are O or S, for example:

Phosphinic acids, e. g.:
  Di-n-hexyl phosphinic acid
  Di-(2-ethyl-hexyl) phosphinic acid
  Di-n-undecyl phosphinic acid
  Di-(paraffin wax) phosphinic acid
  Phosphinic acids derived from polybutenes of molecular weight range 400–10,000
  Di-(amyl-cyclohexyl) phosphinic acid
  Di-(cetyl-cyclopentyl) phosphinic acid
  Di-(tertiary-amyl-phenyl) phosphinic acid
  Di-(n-butyl-nitrophenyl) phosphinic acid
  Di-(chloro-phenyl) phosphinic acid
  Di-(paraffin-wax-phenyl) phosphinic acid Thiophosphinic acids, e. g.:
  Di-n-heptyl thionophosphinic acid
  Di-capryl thiolphosphinic acid
  Di-(paraffin wax) thionophosphinic acid
  Di-n-hexyl dithiophosphinic acid
  Di-isooctyl dithiophosphinic acid
  Di-nonyl dithiophosphinic acid
  Ditetradecyl dithiophosphinic acid
  Didecenyl dithiophosphinic acid
  Dihexadecenyl dithiophosphinic acid
  Dicyclohexyl dithiophosphinic acid
  Di-(methyl-cyclohexyl) dithiophosphinic acid
  Dicyclohexenyl dithiophosphinic acid
  Diphenyl dithiophosphinic acid
  Ditolyl dithiophosphinic acid
  Dinaphthyl dithiophosphinic acid
  Amyl hexyl dithiophosphinic acid
  Isopropyl heptyl dithiophosphinic acid
  Ethyl methylcyclohexyl dithiophosphinic acid Acids of the general formula $RP(XH)_2$ (may exist as $$R-\overset{X}{\underset{XH}{P\diagdown H}})$$

wherein R is an organic radical bonded to phosphorus through a carbon atom and X is O or S, for example:

Phosphonous acids, e. g.:
  n-Hexyl phosphonous acid
  Iso-octyl phosphonous acid
  Paraffin wax phosphonous acid
  Phosphonous acids derived from polybutenes in the molecular weight range of 400 to 10,000
  Lauryl-cyclohexyl phosphonous acid Petroleum naphthenyl phosphonous acid
Hydroabietyl phosphonous acid
Tertiary-amyl-phenyl phosphonous acid
Capryl-nitronaphthyl phosphonous acid
Thiophosphonous acids, e. g.:
    3-hexyl-thiophosphonous acid
    Diisobutyl dithiophosphonous acid
    Mono- and di-thio phosphonous acids derived from—
        (1) Paraffin wax
        (2) Polybutenes in the molecular weight range of 400 to 10,000
    Cetyl-cyclohexyl thiophosphonous acid
    n-Hexyl-phenyl thiophosphonous acid
    Tertiary-butyl-chlorophenyl dithiophosphonous acid
    Ethyl-naphthyl dithiophosphonous acid Acids of the general formula

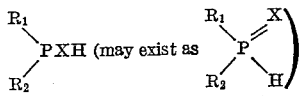

where $R_1$ and $R_2$ are the same or different organic radicals bonded to phosphorous through a carbon atom and X is O or S, for example:

Phosphinous acids, e. g.:
    Di-n-hexyl phosphinous acid
    n-Hexyl capryl phosphinous acid
    Di-eicosyl phosphinous acid
    Di-(lauryl-cyclohexyl) phosphinous acid
    Di-(isopropyl-phenyl) phosphinous acid
    Di-(butyl-nitrophenyl) phosphinous acid
Thiophosphinous acids, e. g.:
    Di-lauryl thiophosphinous acid
    Di-cetyl thiophosphinous acid
    Lauryl chlorononyl thiophosphinous acid
    Di-(petroleum naphthenyl) thiophosphinous acid
    Di-(ethyl-cyclohexyl) thiophosphinous acid
    Di-(decyl nitrophenyl) thiophosphinous acid
    Di-(ethyl chloronaphthyl) thiophosphinous acid Phosphorous acids of undetermined structure containing at least one carbon-to-phosphorous linkage; for example, the acids prepared by reacting 0.5 to 20 parts by weight of at least one of the organic materials listed under A with one part by weight of at least one of the inorganic phosphorizing or phosphosulfurizing agents listed under B for a period of from 2 to 20 hours at 120° to 300° C., then hydrolyzing with hot water, steam, or caustic:

A. Dodecane
    Tetradecane
    Cetane
    Octadecane
    Eicosane
    Tetracosane
    Paraffin waxes of the general formula $C_nH_{2n+n}$, where $n$ is an integer from 25 to 60 octenes, e. g.:
        n-Octene-1
        Diisobutylene
    Nonenes, e. g.:
        n-Nonene-1
        Isononene (propylene trimer)
    Decenes
    Detene
    Octadecenes
    Eicosenes
    Polymerized lower unsaturates, e. g.:
        Polypropylenes
        Polybutylenes
        Polypentenes
        Polyhexenes
    Unsaturated paraffin waxes
    Methyl-cyclohexene
    Cetyl-cyclohexene
    Petroleum naphthenes
    Ethyl-benzene
    Di-propyl benzenes
    Butyl benzenes
    Diisobutyl-benzenes
    Cetyl-benzenes
    Eicosyl-benzenes
    Paraffin wax substituted—
        1. Benzene
        2. Naphthalene
        3. Anthracene
        4. Phenanthrene
    Diphenyl ether
    Butyl diphenyl ether
    Alpha-methyl-naphthalene
    Isobutyl-naphthalene
    Isononyl-naphthalene
    Aromatic fractions from petroleum obtained by solvent-extraction processes
    Thianthrene
    Butyl-phenothiazine
B. $PCl_3$
    $PCl_3$ plus sulfur
    $PCl_3$ plus oxygen or air
    $PSCl_3$
    $POCl_3$
    $P_2S_3$
    $P_2S_5$
    $P_4S_3$
    $P_4S_7$
    $HPO_3$
    $H_4P_2O_6$
    $PH_3$
    Elemental phosphorus
    Elemental phosphorus plus oxygen or air

THE PROMOTER

Compounds which may be employed as promoters in the hereindescribed process are described in copending application, Serial No. 216,101 at page 23, line 19 thereof, through page 35, line 6.

SALTS AND BASES (THE BASING MATERIAL)

Salts and bases which may be employed as the basing material are illustrated by the list of examples contained in copending application, Serial No. 216,101 at page 38, line 23 through page 39, line 34; page 39, line 40 through page 43, line 24; and page 43, line 57 through page 47, line 29.

The formation of the salt complex is accomplished with water or an alcohol or mixtures of both. The water is present as a result of addition to the mixture, or is liberated from compounds incorporated into the mixture as a result of being subjected to processing temperatures. It is preferred to employ water which is added to the mixture.

The alcohol employed can be either monohydric or polyhydric, and should preferably be at least about 5% water soluble at 15° C. Examples of monohydric alcohols are methanol, ethanol, propanol-1, propanol-2, butanol-1, butanol-2, isobutyl alcohol, t-butyl alcohol, pentanol-3, etc.; and examples of polydric alcohols are ethylene glycol, propylene glycol, butylene glycol, amlylene glycol, hexylene glycol, pentaerythritol, etc.

Water and alcohol can be used together in effecting the formation of the salt complex. Ordinarily mixtures of the same in any relative proportion are useful, however it is preferred to employ mixtures containing at least 60% water.

THE ACIDIC MATERIAL

As previously indicated, one form of the process of the present invention includes the step of treating the immediate product with an acidic material for the purpose of liberating therefrom at least a portion of the material previously referred to as the promoter. For a description of the acidic materials which may be used herein, as well as a description of the processing conditions as they pertain to the use of alkaline earth metal reactants, and the relative amounts of reactants to be used in the process, reference may be had to U. S. Patent 2,616,924 column 34 line 28 thereof through column 35 line 18, and column 35 line 37 through column 44 line 20. In this connection while the description of the above-identified patent refers to reactants containing alkaline earth metals, for the purposes of the hereindescribed process it is intended that such descriptions are applicable to metal complexes broadly.

The following examples give the preparation of a plurality of products which range in metal content from about that of the normal salt up to many times that amount.

We have found that sulphate ash and/or metal content values, and the metal ratio values calculated therefrom, are one means for characterizing certain of the salt complexes. As the description of the invention proceeds, it will become apparent that the neutralization number of a salt complex is in certain instances an unreliable index of the amount of excess metal in such complex, since it is greatly affected by the type of inorganic alkaline earth compound employed and can be varied within wide limits without significantly changing the metal content of the product by treatment of the mass with air, $CO_2$, and the like.

The above is not to be construed as a statement that the neutralization number is not an important property of a salt complex. For some uses, for example in lubricants, it is advantageous in certain instances to employ a salt complex of a substantially neutral character, whereas in other instances a salt complex of high alkalinity has been found to produce the desired results.

*Example 1*

1886 grams of isononyl-substituted phenol were admixed with 2760 grams of a 40% oil solution of barium petroleum sulfonate (10.0% sulfate ash content) and such mixture reacted with 295 grams of $P_2S_5$ for 2 hours at 100°–110° C. to prepare di-(isononyl-substituted phenyl) dithiophosphoric acid of situ.

4193 grams of the aforesaid material were then reacted with 396 grams of barium oxide in the presence of 500 ml. of water for one hour at 100–110° C. Thereafter the mass was heated to 150°–160° C. so as to remove substantially all of the water present. The filtered reaction mass comprises a mixture of barium petroleum sulfonate and barium di-(isononyl-substituted phenyl) dithio-phosphate.

726 grams of the filtered mixture of barium petroleum sulfonate and barium di-(isononyl-substituted phenyl) dithio-phosphate, 121 grams of diisobutyl-phenol, 564 grams of low-viscosity mineral oil, and 500 ml. of water were stirred about 60° C. and 265 grams of barium oxide added. The mass was heated for one hour at 100°–110° C. and then raised to 150° C. where it was treated with a current of $CO_2$ until a sample showed a substantially neutral titre. In order to remove substantially all of any water remaining, the mass was heated for an additional hour at 150–160° C.

Filtration of the mass yielded 1452 grams of a brown free-flowing, oil-soluble liquid sulfonate-dithiophosphate complex which was found to have the following analyses:

Basic No. _____ 13.2
Percent barium _____ 17.3
Percent sulfate ash (calculated) _____ 29.4
Percent phosphorus _____ 0.52
Percent sulfur _____ 1.76
Metal ratio _____ 4.39

*Example 2*

(a) A barium salt of a high molecular weight phosphorus acid of undetermined structure was prepared in the following manner:

3408 grams of polymerized isobutylene having an average molecular weight of about 750 were introduced into a reaction vessel equipped with stirrer, thermometer, and reflux condenser. While the mass was stirred at about 210° C., an intimate mixture of 672 grams of powdered $P_2S_5$ and 84 grams of sulfur flowers was added slowly over a period of about 1½ hours. After the addition had been completed, the reaction mass was maintained at 205–215° C. for an additional 2½ hour period.

Thereafter the whole was allowed to cool to about 100° C. and 1082 grams of $Ba(OH)_2.8H_2O$ (95% purity) were added over a two-hour period at 100–115° C. (there is a tendency for the mass to foam during this step of the process, which tendency can be controlled by adding the barium hydrate in small increments). 2556 grams of a low-viscosity, solvent-extracted, Mid-Continent oil were added and the whole was stirred for about 1 hour at 110° C., then substantially all of any water present was removed by heating to 160° C. and maintaining the process mass at that temperature for about 0.5 hour. The crude material was purified by filtration, yielding 5300 grams of a viscous, red-brown, oil-soluble liquid.

(b) 1110 grams of a 40% oil solution of barium petroleum sulfonate (10% sulfate ash content) were mixed with 1610 grams of the barium salt produced under (a) above (ratio of equivalents of sulfonate to salt of high molecular weight phosphorus acid is 1.0). 248 grams of diisobutyl-phenol (ratio of combined equivalents of sulfonate and salt of high molecular weight phosphorus acid to diisobutyl-phenol is 1.66) and 600 ml. of water were added, and the whole was stirred at about 70° C. 603 grams of BaO were added slowly as the temperature was gradually raised to about 105° C. After all of the BaO had been added, the mass was maintained at 105° C. for one hour.

Thereafter, the bulk of the water was removed by heating to 150° C. over a period of approximately 3.5 hours. $CO_2$ was passed through the process mass at 150° C. until a substantially neutral titre was observed, then the $CO_2$ treatment was discontinued and the temperature of mass maintained for one hour at 150°–155° C. to remove substatnially all of any water still present. The mass was filtered, yielding as filtrate 3103 grams of a clear, oil-soluble, brown liquid having the following analyses:

Basic No. _____ 10.2
Percent barium _____ 16.6
Percent sulfate ash (calculated) _____ 28.2
Percent phosphorus _____ 0.67
Percent sulphur _____ 1.15
Metal ratio _____ 4.38

*Example 3*

1110 grams of 40% oil solution of barium petroleum sulfonate (10% sulfate ash content) were mixed with 1110 grams of the barium salt described in Example 2, part a (ratio of equivalents of sulfonate to salt of high molecular weight phosphorus acid is 1.5). 208 grams of diisobutyl-phenol (ratio of combined equivalents of sulfonate and salt of high molecular weight phosphorus acid to diisobutyl-phenol is 1.66) and 300 ml. of water were added, and the whole was stirred at about 70° C. 504 grams of BaO were then introduced and the process mass was raised to 105° C. and maintained at that temperature for about 1 hour.

Thereafter, the bulk of the water was removed by heating to 150° C. over a period of about 2 hours. $CO_2$ was passed through the process mass at 150° C. until a substantially neutral titre was obtained, then the $CO_2$ treatment was discontinued and the mass was maintained at 150° C. for about ½ hour to remove substantially all of any water still present. 31 grams of nonyl alcohol were added and the mass was filtered, yielding as filtrate 2612 grams of a brown, oil-soluble liquid having the following analyses:

| | |
|---|---|
| Basic No | 7.4 |
| Percent barium | 17.2 |
| Percent sulfate ash (calculated) | 29.2 |
| Percent phosphorus | 0.56 |
| Percent sulfur | 1.39 |
| Metal ratio | 4.5 |

Example 4

172 grams of di-(n-hexyl) dithiophosphoric acid, 500 grams of petroleum sulphonic acid, 159 grams of iso-nonyl phenol (ratio of equivalents of oil soluble acids to iso-nonyl phenol is 1.52), and 1,170 cc. of water were mixed together, then 437 grams of BaO were added over a period of ½ hour. The mixture was heated at reflux temperature for 1 hour, followed by heating to 150° C. over a period of 2½ hours, and then maintaining that temperature for 1 hour. The desired product was a viscous liquid, brown in color, and contained a slight odor. The following properties were determined:

| | |
|---|---|
| Basic No | 87.1 |
| Percent barium | 28.6 |
| Percent sulphate ash (calculated from metal content) | 48.8 |
| Metal ratio | 5.22 |

Example 5

172 grams of di-(n-hexyl) dithiophosphoric acid, 500 grams of petroleum sulphonic acid and 98 grams of para-tertiary-butyl phenol (ratio of equivalents of oil soluble acids to para-tertiary-butyl phenol is 1.52) were mixed together. To this mixture was added a slurry of 387 grams of BaO and 1,080 cc. of water. The mixture was heated at 100° C. for one hour, and then the temperature was raised to 150° C. and held at that level for one hour. The product was a highly viscous liquid, brown in color, and contained a slight odor. The following properties of the product were determined:

| | |
|---|---|
| Basic No | 121 |
| Percent barium | 30.05 |
| Sulphate ash (calculated from metal content) | 51.0 |
| Metal ratio | 5.36 |

Example 6

A mixture of 251 grams of di-(2-ethyl hexyl) dithiophosphoric acid, 1150 grams of a 30% by weight oil solution of barium petroleum sulphonate (sulphate ash content 7.6%), 237 grams of isononyl phenol (ratio of equivalents 1.52), 1160 grams of barium oxide and 1550 ml. of water were heated at reflux temperature for one hour, then at 150° C. for one hour. The mixture was cooled to 50° C. and treated with a stream of carbon dioxide until it was neutral. Then it was treated with Hyflo and filtered, the filtrate weighing 1790 grams and having the following properties:

| | |
|---|---|
| Basic No | 30 |
| Percent sulphate ash | 32.3 |
| Metal ratio | 3.86 |

Example 7

A mixture of 497 grams of di-n-hexyl dithiophosphoric acid, 1465 grams of petroleum sulfonic acid, 1160 grams of barium oxide, 297 grams of p-tert-butyl phenol (ratio of equivalents 1.52) and 3100 ml. of water was heated at reflux temperature for one hour, then at 150° C. for one hour. The reaction mixture was cooled to 110° C., treated with a stream of carbon dioxide at this temperature until the mixture was neutral, then treated with Hyflo and filtered. The filtrate weighed 3660 grams and had the following properties:

| | |
|---|---|
| Basic No. | 14.0 |
| Percent sulphate ash | 49.7 |
| Metal ratio | 5.07 |

Example 8

The complex metal salt obtained as described in Example 14 was heated at 100° C. and treated with a stream of carbon dioxide for one hour at which point the mixture was substantially neutral. The resultant product mixture had the following properties:

| | |
|---|---|
| Acid No. | 1.71 |
| Percent sulphate ash | 47.7 |
| Metal ratio | 5.35 |

Example 9

260 grams (0.75 equivalent) of di-n-hexyl dithiophosphoric acid, 717 grams (0.75 equivalent) of a 60% oil solution of petroleum sulfonic acid, 88 grams (0.99 equivalent) of 1-nitro propane, 580 grams (7.6 equivalents) of barium oxide, 760 grams of low viscosity mineral oil, 1½ liters of water were refluxed for one hour at 90 to 100° C. Thereafter the process mass was elevated to 150° C. and held for one hour. After the whole had cooled to room temperature, $CO_2$ was blown through the complex until it showed a substantially neutral titre. It was then filtered yielding a somewhat viscous light brown oil-soluble liquid having the following analysis:

| | |
|---|---|
| Percent sulphur | 2.92 |
| Percent phosphorus | 0.99 |
| Percent barium | 17.9 |
| Percent sulfate ash (calculated) | 13.5 |
| Acid No. | 1.1 |
| Metal ratio | 4.08 |

Example 10

To a mixture of 782 grams of di(keryl-phenyl) dithiophosphinic acid, 1535 grams of a 30% by weight oil solution of barium petroleum sulphonate (sulphate ash content, 7.6%), 314 grams of isononyl phenol (ratio of equivalents, 1.70) and 1970 grams of water, was added 740 grams of barium oxide and this mixture was heated at reflux temperature for one hour. The mixture then was heated to 150° C. and held at this temperature for one hour whereupon it was allowed to cool and was treated at 50–60° C. with a stream of carbon dioxide until the mixture was substantially neutral. It was reheated to 130° C., treated with Hyflo and filtered. The filtrate had the following physical properties:

| | |
|---|---|
| Acid No. | 1.26 |
| Percent sulphate ash | 31.6 |
| Metal ratio | 3.87 |

Example 11

262 grams (0.75 equivalent) of di-n-hexyl dithiophosphoric acid, 1150 grams (0.75 equivalent) of a 30% oil solution of barium petroleum sulphonate, 88 grams (0.99 equivalent) of 1-nitropropane, 524 grams (6.85 equivalents) of barium oxide, and 1.4 liters of water were refluxed for one hour at 100 to 105° C. Thereafter the process mass was elevated to 150° C. After the process mass had cooled to 70° C. it was blown with carbon dioxide for one hour at 40 to 70° C. Filtration of the process mass yielded a viscous oil-soluble dark brown liquid having the following analysis:

| | |
|---|---|
| Percent sulphur | 4.19 |
| Percent phosphorus | 1.29 |
| Percent barium | 24.6 |
| Percent sulphate ash (calculated) | 43.5 |
| Acid No. | 1.35 |
| Metal ratio | 5.42 |

Example 12

193 grams (0.5 equivalent) of di-2-hexyl dithiophosphoric acid, 500 grams (0.5 equivalent) of a 60% oil solution of petroleum sulphonic acid, 59 grams (0.66 equivalent) of 1-nitro propane, 445 grams of barium oxide, 561 grams of low viscosity mineral oil, and 1.2 liters of water were stirred well for one hour at 90 to 100° C. Thereafter the process mass was heated to 150° C. and held there for a period of one hour. On filtration the process mass yielded an oily brown oil-soluble liquid having the following properties:

| | |
|---|---|
| Percent sulphur | 3.23 |
| Percent phosphorus | 1.09 |
| Percent barium | 15.3 |
| Percent sulphate ash (calculated) | 26.0 |
| Basic No. | 41.8 |
| Metal ratio | 3.52 |

Example 13

To a stirred mixture of 765 grams of a 30% by weight oil solution of barium petroleum sulfonate (sulphate ash content, 7.6%), 193 grams of di-n-hexyl thiophosphoric acid, 99 grams of p-tert-butyl phenol (ratio of equivalents, 1.52) and 930 grams of water, was added 348 grams of barium oxide (at a temperature of 80° C.). This mixture was stirred for one hour at 100° C., then for one hour at 150° C. The mixture was cooled to 60° C. and treated for ten hours with a stream of carbon dioxide. Hyflo was added to the product and it was filtered; the filtrate had the following physical properties:

| | |
|---|---|
| Basic No. | 5.43 |
| Percent sulphate ash | 30.5 |
| Metal ratio | 2.38 |

Example 14

A mixture of 765 grams of a 30% by weight oil solution of barium petroleum sulphonate (sulphate ash content, 7.6%), 350 grams of di-(paraffin wax) phosphoric acid, 99 grams of p-tert-butyl phenol (ratio of equivalents, 1.52), 348 grams of barium oxide, 900 grams of water and 25 grams of methylcyclohexanol was heated at 100° C. for one hour, then heated to 150° C. and treated with a stream of carbon dioxide for 1.5 hours at 150–180° C. The product mixture was treated with Hyflo and filtered, the filtrate having the following physical properties:

| | |
|---|---|
| Basic No. | 15 |
| Percent sulphate ash | 32.5 |
| Metal ratio | 3.39 |

Example 15

A mixture of 765 grams of a 30% by weight oil solution of barium petroleum sulphonate (sulphate ash content, 7.6%), 232 grams of mono-(paraffin wax) phosphorous acid, 156 grams of isononyl phenol (ratio of equivalents, 1.52), 344 grams of barium oxide and 900 grams of water was heated at 100° C. for one hour, then heated to 150° C. and treated at this temperature with a stream of carbon dioxide for one hour. Hyflo was added to the mixture and it was filtered. The filtrate had the following physical properties:

| | |
|---|---|
| Basic No. | 4.5 |
| Percent sulphate ash | 30.5 |
| Metal ratio | 3.12 |

Example 16

To a stirred mixture of 416 grams of di(keryl [1]-phenyl) dithiophosphinic acid, 1535 grams of a 30% by weight oil solution of barium petroleum sulphonate (sulphate ash content, 7.6%), 316 grams of isononyl phenol (ratio of equivalents, 1.52) and 1860 grams of water was added in small portions 697 grams of barium oxide. The mixture was heated at reflux temperature for one hour, then at 150° C. for one hour. The product was cooled and treated at 50–60° C. with a stream of carbon dioxide until it was substantially neutral. The mixture was treated with Hyflo and filtered. The filtrate had the following physical properties:

| | |
|---|---|
| Acid No. | 0.82 |
| Percent sulphate ash | 32.1 |
| Metal ratio | 3.57 |

Example 17

A high molecular weight organo-phosphorus acid of undetermined structure was first prepared in the following manner:

1312 grams (10.41 moles) of isononene and 578 grams (2.6 moles) of P₂S₅ were reacted together for about 4 hours at 130° C. The resulting reaction mixture was added slowly to a hot (100° C.) solution of 1574 grams (39.3 moles) of NaOH in 4.7 liters of water and the whole was stirred for 5 hours at 100° C. Ice was then added to dilute and cool the contents and then concentrated hydrochloric acid was added slowly until the mixture was slightly acidic. The organic layer was then extracted with a volume of benzene, washed with water, dried over anhydrous MgSO₄ and filtered. Removal of benzene from the filtrate by heating under reduced pressure yielded the desired organo-phosphorus acid. It was a viscous, red-brown liquid containing 18.3% sulfur and 6.8% phosphorus. Analysis also indicated that it contained carbon to phosphorus linkages.

167 grams (0.355 equivalent) of the above organo-phosphorus acid, 1110 grams (1.0 equivalent) of a 40% oil solution of barium petroleum sulfonate (10.0% sulfate ash content), 168 grams (0.817 equivalent) of di-isobutyl-phenol (ratio of equivalents of combined sulfonate and organo-phosphorus acid to diisobutyl-phenol is 1.66), 436 grams (5.7 equivalents) of BaO, and 288 ml. of water were mixed and stirred at 90°–100° C. for one hour. Thereafter the process mass was heated to 150° C. to remove the bulk of the water. After most of the water had been removed, a current of CO₂ was admitted until a titre of the mass indicated that it was substantially neutral (about 2 hours required). After heating the process mass for an additional hour at 150° C. it was filtered. The filtered product was a clear, viscous, dark-brown, oil-soluble liquid having the following analysis:

| | |
|---|---|
| Percent sulfur | 2.53 |
| Percent phosphorus | 0.52 |
| Percent barium | 21.2 |
| Percent sulfate ash (calculated) | 36.0 |
| Metal ratio | 4.52 |
| Basic No. | 13.9 |

Example 18

1409 grams (4.76 moles) of eicosyl alcohol and 264 grams (1.18 moles) of P₂S₅ were reacted for 4 hours at 96° C. to prepare di-eicosyl dithiophosphate. The latter compound was blown with steam for 1.5 hours at 100°–120° C. to remove one of the sulfur atoms in the molecule, yielding di-eicosyl monothiophosphate.

325 grams (0.548 equivalent) of di-eicosyl monothiophosphate, 1110 grams (1 equivalent) of a 40% oil solution of barium petroleum sulfonate (10% sulfate ash content), 192 grams (0.93 equivalent) of diisobutyl-phenol (ratio of equivalents of combined thiophosphate and sulfonate to diisobutyl-phenol is 1.66), 508 grams (6.64 equivalents) of BaO, and 326 ml. of water were stirred and heated for one hour at 100° C. Thereafter the process mass was heated to 150° C. and blown with a current of CO₂ until a substantially neutral titre was obtained (about 2 hours required). The mass was then heated an additional hour at 150° C. to remove substantially all of any water present and filtered. The filtered

---

[1] Keryl; radical derived by abstraction of H from kerosene.

product was a clear, dark-brown, viscous oil-soluble liquid having the following analyses:

Percent sulfur _____ 2.0
Percent phosphorus _____ 0.55
Percent barium _____ 21.3
Percent sulfate ash (calculated) _____ 36.2
Metal ratio _____ 4.52
Basic No. _____ 9.1

*Example 19*

2848 grams of hydroabietyl alcohol were reacted with 484 grams of $P_2S_5$ for 4 hours at 96° C. to prepare di-hydroabietyl dithiophosphate. The latter compound was treated with steam for 1.5 hours at 100–120° C. to remove one of the sulfur atoms in the molecule, yielding di-hydroabietyl monothiophosphate.

299 grams (0.4 equivalent) of di-hydroabietyl monothiophosphate, 1110 grams of a 40% oil solution of a mixture equal molecular parts of barium petroleum sulfonate and barium di-isododecyl benzene sulfonate, 174 grams (0.843 equivalent) of diisobutyl-phenol (ratio of equivalents of combined phosphorus acid and sulfonates to diisobutyl-phenol is 1.66), 493 grams of BaO, and 317 ml. of water were stirred one hour at 100° C. Thereafter the process mass was heated to 150° C. and blown with a current of $CO_2$ until a substantially neutral titre was obtained (about 1.5 hours required). The mass was then heated for an additional hour at 150° C. and filtered. The filtered product was a viscous, dark-brown, oil-soluble liquid which became tacky on cooling to room temperature. It analyzed as follows:

Percent sulfur _____ 2.1
Percent phosphorus _____ 0.60
Percent barium _____ 20.0
Percent sulfate ash (calculated) _____ 34.0
Basic No. _____ 8.5
Metal ratio _____ 4.45

*Example 20*

A high molecular weight organo-phosphorus acid of indeterminate composition was made in the following manner:

1200 grams of an aromatic petroleum fraction obtained by solvent-extraction of petroleum was reacted with 222 grams of $P_2S_5$ for 4 hours at 220–230° C. and then steam-blown for 3.5 hours at 210° C. The highly viscous organo-phosphorus acid thus prepared was found to contain 4.35% phosphorus, 1.7% sulfur, and to have an acid number of 129.

287 grams (0.66 equivalent) of the above organophosphorus acid, 1110 grams (1 equivalent) of a 40% oil solution of barium petroleum sulfonate, 206 grams (1 equivalent) of diisobutyl-phenol (ratio of combined equivalents of phosphorus acid and sulfonate to diisobutyl-phenol is 1.66), 550 grams (7.2 equivalents) of BaO, and 320 ml. of water were stirred for one hour at 100° C. Thereafter the process mass was elevated to 150° C. and treated with $CO_2$ at that temperature until a substantially neutral titre was obtained on the process mass. After an additional hour of heating, the whole was filtered. The filtered product was viscous, brown, oil-soluble liquid having the following analyses:

Percent sulfur _____ 1.67
Percent phosphorus _____ 0.41
Percent barium _____ 21.6
Percent sulfate ash (calculated) _____ 36.7
Basic No. _____ 18.2
Metal ratio _____ 4.35

*Example 21*

A high molecular weight phosphorus acid of undetermined structure was prepared in the following manner:

3408 grams of polymerized isobutylene having an average molecular weight of about 750 were introduced into a reaction vessel equipped with stirrer, thermometer, and reflux condenser. While the mass was stirred at about 210° C., an intimate mixture of 672 grams of powdered $P_2S_5$ and 84 grams of sulfur flowers was added slowly over a period of about 1½ hours. After the addition had been completed the reaction mass was maintained at 205°–215° C. for an additional 2½ hour period. The resulting mass was blown with steam for 2 hours at 205–215° C. to remove some of the combined sulfur. The organo-phosphorus acid thus prepared contained 1.5% sulfur, 4.75% phosphorus, and had an acid number of 117.

240 grams (0.5 equivalent) of the above phosphorus acid, 555 grams (0.5 equivalent) of a 40% oil solution of barium petroleum sulfonate, 124 grams (0.6 equivalent) of diisobutylphenol (ratio of combined equivalents of phosphorus acid and sulfonate to diisobutyl-phenol is 1.66), 340 grams (4.44 equivalents) of BaO, 300 ml. of water, and 565 grams of low-viscosity mineral oil were stirred together for 1 hour at 100° C. Thereafter the process mass was heated to 150° C. over a 2 hour period and then blown with a current of $CO_2$ until the mass showed a substantially neutral titre (about 1 hour required). After heating for an additional half-hour to remove substantially all of the water, the process mass was filtered. The filtered product was a brown, oil-soluble liquid having the following analyses:

Percent sulfur _____ 1.04
Percent phosphorus _____ 0.52
Percent barium _____ 15.8
Percent sulfate ash (calculated) _____ 26.8
Basic No. _____ 8.7
Metal ratio _____ 4.25

*Example 22*

750 grams (1 mole) of polymerized isobutylene having an average molecular weight of 750 were heated to 250° C. and treated with 510 grams (3 moles) of $PSCl_3$ over a 4.5 hour period. After all of the $PSCl_3$ had been added, the whole was heated for 0.25 hour at 240°–250° C. and a vacuum applied to remove volatile material. The residue was mixed with 375 grams of low viscosity mineral and blown with superheated steam for 1.5 hours at 150°–175° C. Thereafter the material was diluted with a volume lactol spirits (a commercial hydrocarbon solvent), filtered, and subjected to distillation to remove the solvent. The organo-phosphorus acid of indeterminate composition thus prepared was a viscous, brown liquid containing 1.87% sulfur, 5.2% phosphorus, and had an acid number of 84. Analysis also indicated the presence of carbon to phosphorus linkages.

240 grams (0.363 equivalent) of said phosphorus acid, 1110 grams (1.0 equivalent) of a 40% oil solution of barium petroleum sulfonate, 169 grams (0.82 equivalent) of diisobutylphenol (ratio of combined equivalents of phosphorus acid and sulfonate to diisobutyl-phenol is 1.66), 439 grams (5.73 equivalents) of BaO, and 320 ml. of water were stirred together for about one hour at 100° C. Thereafter the process mass was elevated to 150° C. and blown with a current of $CO_2$ until the whole showed a substantially neutral titre. After the carbonation was completed, the mass was heated for an additional hour at 150° C. and then filtered. The filtered product was a viscous, brown, oil-soluble liquid having the following analyses:

Percent sulfur _____ 1.77
Percent phosphorus _____ 0.52
Percent barium _____ 20.1
Percent sulfate ash (calculated) _____ 34.2
Basic No. _____ 12.7
Metal ratio _____ 4.53

*Example 23*

1000 grams of unsaturated paraffin wax and 240 grams of $P_2S_5$ were reacted together for about 4 hours at 140° C. 1250 grams of this reaction product were added slowly to a hot (100° C.) solution of 352 grams of NaOH in 1056 ml. of water and the whole was heated for 5 hours at the reflux temperature. After the process mass had cooled, it was acidified with hydrochloric acid. The organic layer was extracted with a volume of benzene, washed with water, and heated under reduced pressure to remove the benzene solvent. The organo-phosphorus acid of undetermined composition thus obtained was a brown liquid having an acid number of 61 and containing 7.8% sulfur and 3.4% phosphorus. It was found to contain carbon to phosphorus linkages.

928 grams (0.361 equivalent) of said phosphorus acid, 928 grams of a 40% oil solution of a mixture of equal molecular parts of barium petroleum sulfonate and barium di-isododecyl benzene sulfonate, 144 grams (0.7 equivalent) of diisobutyl-phenol (ratio of combined equivalents of phosphorus acid and sulfonates to diisobutyl-phenol is 1.66), 378 grams (4.94 equivalents) of BaO, and 300 ml. of water were stirred together for 1 hour at 100° C. Thereafter the process mass was heated to 150° C. and blown with a current of $CO_2$ until the mass showed a substantially neutral titre (about 2 hours required). After an additional hour of heating at 150° C., the process mass was filtered. The filtered product was a viscous, dark-brown, oil-soluble liquid having the following analyses:

| | |
|---|---|
| Percent sulfur | 2.64 |
| Percent phosphorus | 0.56 |
| Percent barium | 19.8 |
| Percent sulfate ash (calculated) | 33.7 |
| Basic No. | 13.4 |
| Metal ratio | 4.61 |

*Example 24*

430 grams (0.55 mole) of chlorinated polyisobutylene (prepared by chlorinating polyisobutylene of 750 average molecular weight with chlorine gas at 20°–30° C. until it combined with 6% chlorine) were mixed with 21.5 grams of Superfiltrol (an acid-activated clay) and heated to 170° C. Thereupon, 185 grams (1.09 moles) of $PSCl_3$ were added over a period of 4 hours while the process mass was held at 170°–200° C. After all of the $PSCl_3$ had been added, the whole was heated for 15 minutes at 220°–230° C. and a vacuum applied to remove volatile material. The residue was mixed with 215 grams of low viscosity mineral oil and steam-blown for 1.5 hours at 150°–185° C. Thereafter the process mass was heated at 170°–190° C. until substantially all of the water was removed. The filtered product, a high molecular weight organophosphorus acid of undetermined structure, was a viscous, dark-brown oil having an acid number of 61 and containing 1.51% sulfur, 3.4% phosphorus, and 0.32% chlorine.

452 grams (0.49 equivalent) of said phosphorus acid, 1273 grams (0.99 equivalent) of a 35% oil solution of barium petroleum sulfonate, 183 grams (0.892 equivalent) of diisobutylphenol, 483 grams (6.31 equivalents) of BaO, 242 ml. of water, and 885 grams of low viscosity mineral oil were heated together for one hour at 100° C. Thereafter the process mass was heated to 150°–160° C. and blown with a current of $CO_2$ until it gave a substantially neutral titre (about 2 hours required). After the mass had been heated an additional hour it was filtered. The filtered product was an oily, dark-brown, oil-soluble liquid having the following analyses:

| | |
|---|---|
| Percent sulfur | 1.33 |
| Percent phosphorus | 0.37 |
| Percent chlorine | 0.25 |
| Percent barium | 13.2 |
| Percent sulfate ash (calculated) | 22.4 |
| Basic No. | 4.5 |
| Metal ratio | 4.43 |

*Example 25*

420 grams (0.54 mole) of chlorinated polyisobutylene containing about 6% chlorine and prepared in the manner set forth in Example 24 were mixed with 34 grams (1.06 atoms) of sulfur flowers and 26.5 grams of Superfiltrol and heated to 150° C. 147 grams (1.06 moles) of $PSCl_3$ were added slowly to the process mass, maintaining the temperature between 150° and 190° C. After all of the $PSCl_3$ had been added, the whole was heated for 1.25 hours at 192°–215° C. and then stripped of volatile material at 170° C. and 80 mm. Hg absolute pressure. 210 grams of low viscosity mineral oil were added and the mass was blown with steam for 1.5 hours at 150°–190° C. and then heated at 190° C. under reduced pressure to remove volatile material. The process mass was filtered, yielding a viscous, dark-brown, oily organo-phosphorus acid of undetermined structure which had an acid No. of 60 and contained 1.67% sulfur, 2.85% phosphorus, and 0.48% chlorine. The presence of carbon to phosphorus linkages was also established.

422 grams (0.454 equivalent) of said phosphorus acid, 938 grams (0.73 equivalent) of a 35% oil solution of barium petroleum sulfonate, 147 grams (0.713 equivalent) of diisobutylphenol, 392 grams (5.12 equivalents) of BaO, and 196 ml. of water were mixed and heated for one hour at 90–100° C. Thereafter the process mass was heated to 150° C. and blown with a current of $CO_2$ for 2 hours, at the end of which time a substantially neutral titre was obtained on the mass. After the whole had been heated an additional hour at 150° C. it was diluted with 728 grams of low viscosity mineral oil and filtered. The filtered product was a somewhat viscous, dark-brown, oil-soluble liquid having the following analyses:

| | |
|---|---|
| Percent sulfur | 1.27 |
| Percent phosphorus | 0.41 |
| Percent chlorine | 0.22 |
| Percent barium | 13.3 |
| Percent sulfate ash (calculated) | 22.6 |
| Basic No. | 6.6 |
| Metal ratio | 4.45 |

*Example 26*

1975 grams (2.63 moles) of polymerized isobutylene having an average molecular weight of about 750 were heated to 215° C. and 894 grams (5.26 moles) of $PSCl_3$ were added slowly thereto at 215°–240° C. over a period of about 8 hours. After the process mass had been stripped of volatile material at 210° C. under reduced pressure, it was admixed with 985 grams of low viscosity mineral oil.

750 grams of said reaction product were mixed with 0.5 liter of benzene and 100 ml. of water and treated with 107 grams of BaO, whereupon the temperature rose to about 60° C. 200 ml. of isopropanol were added and the whole was stirred for 3 hours at 50°–60° C. Thereafter the process mass was washed with water and dried by heating to 120° C. under reduced pressure. The residue, a barium salt of a high molecular weight organophosphorus acid of undetermined structure, was a brown, oil-soluble, viscous liquid containing 2.83% sulfur, 2.4% phosphorus, and 4.8% barium. Analysis also established the presence of carbon to phosphorus linkages.

450 grams (0.317 equivalent) of said organo-phosphorus salt, 762 grams (0.593 equivalent) of a 35% oil solution of barium petroleum sulfonate, 113 grams (0.548 equivalent) of diisobutyl-phenol, 275 grams (3.59 equivalents) of BaO, and 140 ml. of water were heated together for one hour at 90°–100° C. Thereafter the process mass was heated to 150° C. and blown with a current of $CO_2$ until a substantially neutral titre was obtained on the mass (about 2 hours required). After the whole had been heated an additional hour at 150° C. to drive off substantially all of any water present, it was filtered.

The filtered product was an oily, dark-brown, oil-soluble liquid having the following analyses:

| | |
|---|---|
| Percent sulfur | 1.62 |
| Percent phosphorus | 0.52 |
| Percent barium | 12.5 |
| Percent sulfate ash (calculated) | 21.2 |
| Basic No. | 7.3 |
| Metal ratio | 4.2 |

*Example 27*

155 grams (0.62 equivalent) of eicosyl phosphonic acid, prepared in the manner set forth in U. S. 2,587,340 and extracted with methanol to remove unconverted eicosane, were admixed with 1110 grams (1.0 equivalent) of a 40% oil solution of barium petroleum sulfonate, 203 grams (0.978 equivalent) of diisobutyl-phenol, 536 grams (7.01 equivalents) of BaO, and 320 ml. of water and heated for one hour at 90°–100° C. Thereafter the process mass was heated to 150°–160° C. and blown with a current of $CO_2$ until a substantially neutral titre was observed on a sample of the mass (about 2 hours required). After the whole has been heated an additional hour at 150° C., it was filtered. The filtered product was a viscous, dark-brown, oil-soluble liquid having the following analyses:

| | |
|---|---|
| Percent sulfur | 1.64 |
| Percent phosphorus | 0.50 |
| Percent barium | 24.4 |
| Percent sulfate ash (calculated) | 41.5 |
| Basic No. | 16.7 |
| Metal ratio | 4.72 |

*Example 28*

1300 grams (5.62 moles) of iso-octadecene (propylene hexamer) were reacted with 312 grams (1.4 moles) of $P_2S_5$ for 5 hours at 100° C. and 5 hours at 140°–150° C. Said reaction product was added dropwise to a refluxing solution of 352 grams of NaOH in 1 liter of water and the whole was stirred for about 5 hours at 100° C. After the process mass had cooled, it was acidified with concentrated hydrochloric acid and extracted with a volume of benzene. The benzene extract was washed with water and then heated under reduced pressure to remove the benzene solvent. The organo-phosphorus acid of undetermined structure thus obtained was a brown, oily liquid having an acid number of 38 and containing 4.4% sulfur and 2.4% phosphorus. It was also established that the material contained carbon to phosphorus linkages.

360 grams (0.244 equivalent) of said organo-phosphorus acid, 610 grams (0.526 equivalent) of a 40% oil solution of barium petroleum sulfonate, 96 grams (0.464 equivalent) of diisobutyl-phenol, 251 grams (3.27 equivalents) of BaO, and 212 ml. of water were mixed and stirred for one hour at 90°–100° C. The temperature was then elevated to 150° C. and a current of $CO_2$ was blown through the process mass for 2 hours. After an additional hour of heating at 150° C., the process mass was filtered. The filtered product was a brown, oil-soluble liquid having the following analyses:

| | |
|---|---|
| Percent sulfur | 2.34 |
| Percent phosphorus | 0.60 |
| Percent barium | 18.3 |
| Percent sulfate ash (calculated) | 31.2 |
| Basic No. | 8.5 |
| Metal ratio | 4.73 |

*Example 29*

260 grams (0.37 equivalent) of bis-(tri-tertiary-amyl-phenyl) dithiophosphinic acid, 1030 grams (0.887 equivalent) of a 40% oil solution of barium petroleum sulfonate, 156 grams (0.757 equivalent) of diisobutyl-phenol, 410 grams (5.35 equivalents) of BaO, and 290 ml. of water were stirred together for one hour at 90°–100° C. The temperature of the process mass was elevated to 150°–160° C. and a current of $CO_2$ was admitted through the mass for 2 hours at said temperature. Thereafter, the whole was heated for an additional hour at 150° C. and filtered. The filtered product was a viscous, dark-brown, oil-soluble liquid having the following analyses:

| | |
|---|---|
| Percent sulfur | 2.72 |
| Percent phosphorus | 0.60 |
| Percent barium | 20.8 |
| Percent sulfate ash (calculated) | 35.3 |
| Basic No. | 6.0 |
| Metal ratio | 4.7 |

*Example 30*

3480 grams of polymerized isobutylene having an average molecular weight of about 750 were heated to 210° C. and an intimate mixture of 672 grams of $P_2S_5$ and 84 grams of sulfur flowers was added thereto over a period of 1.75 hours. After all of the $P_2S_5$—S mixture had been added, the whole was heated for 1.5 hours at 210° C., diluted with 2600 grams of low viscosity mineral oil, and blown with steam for 5 hours at 210°–215° C. The filtered material, a high molecular weight organo-phosphorus acid of undetermined structure, had an acid No. of 68 and contained 0.9% sulfur and 2.14% phosphorus.

820 grams (1.0 equivalent) of this organo-phosphorus acid, 56 grams (1.5 equivalents) of $Ca(OH)_2$, and 200 ml. of water were refluxed for 2 hours and then elevated to 150° C. to remove substantially all of the water (2 hours at 150° C. required). The filtered process mass comprises an oil solution of the calcium salt of the organo-phosphorus acid.

In a separate vessel, 488 ml. of water, 458 grams (4.88 equivalents) of phenol, and 90 grams (2.44 equivalents) of $Ca(OH)_2$ were refluxed for 2 hours. To this vessel were added 333 grams (0.5 equivalent) of the above-described calcium salt of organo-phosphorus acid and 525 grams (0.5 equivalent) of a 45% oil solution of calcium petroleum sulfonate (6.5% sulfate ash content). The process mass was refluxed for 2 hours at 100°–110° C. and then heated to 150° C. where it was blown with $CO_2$ for one hour. The substantially neutral process mass was then heated to 200° C. under reduced pressure Phenol, freed from calcium phenate by the carbonation step, was recovered to the extent of 91% in the distillate. The residue was diluted with 300 grams of low viscosity mineral oil and filtered. The filtrate, the desired end-product, was a brown, oil-soluble liquid having the following analyses:

| | |
|---|---|
| Percent sulfur | 1.16 |
| Percent phosphorus | 0.50 |
| Percent calcium | 4.18 |
| Percent sulfate ash (calculated) | 14.2 |
| Basic No. | 16.2 |
| Metal ratio | 2.57 |

*Example 31*

741 grams (0.905 equivalent) of the organo-phosphorus acid described in Example 30, 160 grams (1.35 equivalents) of wet, freshly precipitated $Mg(OH)_2$ containing 24% magnesium, and 100 ml. of water were refluxed for 2 hours and then heated at 150° C. to remove substantially all of the water present (about 2 hours required). The filtered material comprises the magnesium salt of the organo-phosphorus acid. It was found to contain 1.9% magnesium, 0.93% sulfur, and 1.99% phosphorus.

In a separate vessel, 94.6 grams (7.88 equivalents) of magnesium turnings were reacted with anhydrous methanol (1.5 liters) at the reflux temperature to prepare a methanol solution of magnesium methoxide. To this solution were added 953 grams (1.0 equivalent) of a 39% oil solution of magnesium petroleum sulfonate, 632 grams (1.0 equivalent) of the above described magnesium salt of organo-phosphorus acid, and 248 grams (1.204 equivalents) of diisobutyl-phenol. The whole was stirred for 2 hours under reflux, then the methanol was distilled off. Thereafter, 80 ml. of water were added and the process mass was elevated to 150° C., where it was blown with a current of $CO_2$ for one hour. The process mass was diluted with 900 grams of low viscosity mineral oil and 80 grams of nonyl alcohol and filtered. The filtered end product was a brown, oil-soluble liquid having the following analyses:

| | |
|---|---|
| Percent sulfur | 1.32 |
| Percent phosphorus | 0.40 |
| Percent magnesium | 3.75 |
| Percent sulfate ash (calculated) | 18.6 |
| Acid No. | 15.5 |
| Metal ratio | 4.77 |

*Example 32*

1764 grams of the organo-phosphorus acid described in Example 30, 110 grams (2.6 equivalents) of $LiOH \cdot H_2O$, and 300 ml. of water were refluxed for 1.5 hours, then heated to 150° C. and held there for 1.5 hours to remove substantially all of the water. The process mass was filtered, yielding, as filtrate, the lithium salt of the organo-phosphorus acid. It was a brown liquid containing 1.0% sulfur, 2.3 phosphorus, and 0.96% lithium.

In a separate vessel, 622 grams (1.0 equivalent) of a 60% oil solution of petroleum sulfonic acid, 600 grams of low viscosity mineral oil, 200 ml. of water, and 379 grams (8.99 equivalents) of $LiOH \cdot H_2O$ were warmed to 70° C. and mixed with 754 grams (1.0 equivalent) of the above-described lithium salt of organo-phosphorus acid and 248 grams (1.204 equivalents) of diisobutyl-phenol. The process mass was refluxed for 2 hours and then heated at 150° C. for 2 hours. A current of $CO_2$ was blown through the mass for 1 hour at 150° C., rendering it substantially neutral to titre. After the mass had heated an additional half-hour at 150° C., it was filtered. The filtered product was a brown, oil-soluble liquid having the following analyses:

| | |
|---|---|
| Percent sulfur | 1.77 |
| Percent phosphorus | 0.74 |
| Percent lithium | 2.34 |
| Percent sulfate ash (calculated) | 18.5 |
| Basic No. | 5.7 |
| Metal ratio | 4.13 |

*Example 33*

738 grams of the organo-phosphorus acid described in Example 30, 902 grams of low viscosity mineral oil, and 800 ml. of water were stirred at 70° C. Then 111 grams (3.0 equivalents) of $Ca(OH)_2$ were added and the mass was refluxed for 0.5 hour. Thereafter, 185 grams (5.0 equivalents) of $Ca(OH)_2$, 1050 grams (1.0 equivalent) of a 45% oil solution of calcium petroleum sulfonate, and 1315 grams (14.0 equivalents) of phenol were added and the process mass was refluxed for 3 hours. Substantially all of the water was removed by heating to 150° C., at which temperature $CO_2$ was blown through the mass for 2 hours to render it substantially neutral on titre. A vacuum was then applied and the temperature of the mass was raised to 200° C. to remove substantially all of the original phenol used. The phenol was liberated from the calcium phenate in the process mass by the carbonation step.

After substantially all of the phenol had been removed, the residue was filtered. The filtered end-product was a brown, oil-soluble liquid having the following analyses:

| | |
|---|---|
| Percent sulfur | 1.32 |
| Percent phosphorus | 0.47 |
| Percent calcium | 4.47 |
| Percent sulfate ash (calculated) | 15.2 |
| Basic No. | 11.5 |
| Metal ratio | 3.22 |

*Example 34*

The experiment described in Example 33, was repeated using 590 grams (1.0 equivalent) of a 65% oil solution of di-isododecyl benzene sulfonic acid in lieu of the 1.0 equivalent of calcium petroleum sulfonate specified therein. The filtered end-product in this instance was a brown, oil-soluble liquid having the following analyses:

| | |
|---|---|
| Percent sulfur | 1.08 |
| Percent phosphorus | 0.49 |
| Percent calcium | 4.1 |
| Percent sulfate ash (calculated) | 14.0 |
| Basic No. | 11.5 |
| Metal ratio | 2.96 |

*Example 35*

457 grams of the organo-phosphorus acid described in Example 30, 660 grams (0.467 equivalent) of a 30% oil solution of equal molecular proportions barium petroleum sulfonate (i. e., "mahogany" sulfonate) and barium white oil sulfonate (prepared from white oil sulfonic acid, which in turn was made by the well-known Reed process), 116 grams (0.562 equivalent) of diisobutyl-phenol, 318 grams (4.14 equivalents) of BaO, and 160 ml. of water were stirred for one hour at 90°–100° C. The temperature of the process mass was then elevated to 150° C. and blown with $CO_2$ for 2 hours to render the mass substantially neutral on titre. Thereafter the whole was heated an additional hour at 150° C., mixed with 518 grams of low viscosity mineral oil, and filtered. The filtered product was a somewhat viscous, dark-brown, oil-soluble liquid having the following analyses:

| | |
|---|---|
| Percent sulfur | 1.16 |
| Percent phosphorus | 0.42 |
| Percent barium | 13.84 |
| Percent sulfate ash (calculated) | 23.5 |
| Basic No. | 8.3 |
| Metal ratio | 4.66 |

*Example 36*

565 grams (2 moles) of eicosane were heated to 194° C. and 169.3 grams (1 mole) of $PSCl_3$ were added thereto slowly beneath the surface over a 2 hour period at 194°–220° C. The temperature was then elevated over a 6 hour period to 254° C., whereupon a vacuum was applied to remove volatile material. The residue was steam-blown for 2 hours at 200° C., yielding a brown, waxy solid whose analysis corresponding approximately to di-eicosyl phosphinic acid.

238 grams (0.365 equivalent) of said organo-phosphorus acid, 724 grams (0.624 equivalent) of barium petroleum sulfonate, 123 grams (0.596 equivalent) of diisobutyl-phenol, 326 grams (4.26 equivalents) of BaO, and 222 ml. of water were stirred together for one hour at 90°–100° C. The temperature of the process mass was then elevated to 150° C. and a current of $CO_2$ was blown through the mass at 150° C. for 2 hours to render it substantially neutral on titre. Thereafter, the whole was heated an additional hour at 150 C. and filtered. The filtered end-product was a somewhat viscous, oil-soluble, dark-brown liquid having the following analyses:

| | |
|---|---|
| Percent sulfur | 1.44 |
| Percent phosphorus | 0.59 |
| Percent barium | 21.0 |
| Percent sulfate ash | 31.8 |
| Basic No. | 8.9 |
| Metal ratio | 4.55 |

*Example 37*

1110 grams (1.0 equivalent) of a 40% oil solution of barium petroleum sulfonate, 115 grams (0.35 equivalent) of di-(2-ethyl-hexyl) phosphoric acid, 168 grams (0.813 equivalent) of diisobutyl-phenol, 434 grams (5.67 equivalents) of BaO, and 280 ml. of water were stirred together for 2 hours at 110° C. The temperature of the mass was elevated to 150° C. and a current of $CO_2$ was blown through the mass for 1.5 hours. Thereafter, the whole was heated for an additional 0.5 hour at 150° C. to remove substantially all of any water still remaining and then filtered. The filtered end-product was a viscous, dark-brown, oil-soluble liquid having the following analyses:

Percent sulfur _____ 1.64
Percent phosphorus _____ 0.54
Percent barium _____ 21.6
Percent sulfate ash (calculated) _____ 36.7
Basic No. _____ 12.2
Metal ratio _____ 4.48

*Example 38*

945 grams of the barium salt of the organo-phosphorus acid described in Example 30, 713 grams (0.6 equivalent) of a 37% oil solution of barium di-isododecyl benzene sulfonate, 149 grams (0.723 equivalent) of diisobutyl-phenol, 362 grams (4.73 equivalents) of BaO, and 300 ml. of water were stirred together for 1 hour at 100°–110° C. The temperature of the process mass was then elevated to 150° C. and $CO_2$ was blown through the mass for 1 hour to render it substantially neutral on titre. Thereafter, the process mass was heated for an additional 0.5 hour at 150° C. and filtered. The filtered end-product was a brown, oil-soluble liquid having the following analyses:

Percent sulfur_____ 1.07
Percent phosphorus_____ 0.67
Percent barium_____ 16.2
Percent sulfate ash (calculated)_____ 27.6
Basic No. _____ 6.9
Metal ratio_____ 4.31

*Example 39*

500 grams of the potassium salt of the organo-phosphorus acid described in Example 30, 470 grams (0.424 equivalent) of 40% oil solution of barium petroleum sulfonate, 105 grams (0.51 equivalent) of diisobutyl-phenol, 288 grams (3.76 equivalents) of BaO, and 100 ml. of water were heated together for one hour at 100°–110° C. The temperature of the process mass was then raised to 150° C. and $CO_2$ was blown through the mass for one hour to render it substantially neutral on titre. Thereafter the whole was heated an additional 0.5 hour to remove substantially all of any water present and then filtered. The filtered end-product was a brown, oil-soluble liquid having the following analyses:

Percent sulfur_____ 1.26
Percent phosphorus_____ 0.87
Percent potassium_____ 1.1
Percent barium_____ 18.4
Percent sulfate ash (calculated total)_____ 33.8
Basic No. _____ 12.2
Metal ratio_____ 5.07

*Example 40*

426 grams (3 moles) of alpha-methyl naphthalene were heated to 176° C. and 510 grams (3 moles of $PSCl_3$ were added slowly thereto over an 8 hour period at 186°–214° C. The temperature was then elevated to 263° C. and a vacuum applied to remove volatile material. The residue was steam-blown for one hour at 160°–185° C. and then dried by heating at 180° C. under reduced pressure. The residue, a high molecular weight organo-phosphorus acid of undetermined structure, was a brittle solid having an acid number of 290 and containing 4.14% sulfur and 13.9% phosphorus. Analysis also established the presence of carbon to phosphorus linkages.

50 grams (0.259 equivalent) of said organo-phosphorus acid, 731 grams (0.568 equivalent) of a 35% oil solution of a mixture of equal molecular parts of barium di-isododecyl benzene sulfonate and barium petroleum sulfonate, 102 grams (0.498 equivalent) of diisobutyl-phenol, 270 grams (3.52 equivalents) of BaO, 689 grams of low viscosity mineral oil, and 135 ml. of water were stirred at the reflux temperature for one hour. The temperature of the process mass was then elevated to 150° C. and $CO_2$ was blown through the mass for 2 hours to render it substantially neutral on titre. Thereafter the whole was heated an additional hour at 150° C. and filtered. The filtered end-product was a somewhat viscous, dark-brown, oil-soluble liquid having the following analyses:

Percent sulfur_____ 1.28
Percent phosphorus_____ 0.21
Percent barium_____ 14.1
Percent sulfate ash (calculated)_____ 24.0
Basic No. _____ 6.4
Metal ratio_____ 4.75

*Example 41*

510 grams (3 moles) of diphenyl ether and 10 grams of zinc chloride were heated to 190° C. and 510 grams (3 moles) of $PSCl_3$ were added thereto slowly over a period of 10.5 hours at 190°–265° C. Thereafter, volatile material was removed at 210° C. and 2.5 mm. Hg absolute pressure. The residue was steam-blown at 160°–180° C. and when it became highly viscous, 300 ml. of ethanol, 250 ml. of water, and 600 ml. of xylene were added. The process mass was then refluxed for 2 hours. The organic layer was separated and the solvents removed by heating to 160° C. under reduced pressure. The residue, a high molecular weight organo-phosphorus acid of undetermined structure, was a brittle solid having an acid number of 108.

75 grams (0.145 equivalent) of said acid, 835 grams (0.65 equivalent) of a 35% oil solution of barium petroleum sulfonate, 99 grams (0.478 equivalent) of diisobutyl-phenol, 251 grams (3.28 equivalents) of BaO, 502 grams of low viscosity mineral oil, and 130 ml. of water were stirred together for one hour at the reflux temperature. The temperature of the process mass was then elevated to 150° C. and $CO_2$ was blown through the mass for 2 hours. Thereafter, the whole was treated for an additional hour at 150° C. and filtered. The filtered end-product was a somewhat viscous, dark-brown, oil-soluble liquid having the following analyses:

Percent sulfur_____ 1.57
Percent phosphorus_____ 0.12
Percent barium_____ 13.7
Percent sulfate ash (calculated)_____ 23.3
Basic No. _____ 5.3
Metal ratio_____ 4.62

*Example 42*

1800 grams (2 moles) of wax-substituted naphthalene were reacted with 111 grams (0.5 mole) of $P_2S_5$ for 5 hours at 225° C. The resulting material was heated at 150° C. and steam-blown for 2 hours. Thereafter, the water was removed by heating to 140° C. under reduced pressure, leaving an oily, brown liquid organo-phosphorus acid having an acid No. of 48 and containing 1.18% sulfur and 1.54% phosphorus. Analysis also established the presence of carbon to phosphorus linkages.

575 grams (0.382 equivalent) of the barium salt of said organo-phosphorus acid (prepared by reacting the acid with BaO at 70°–110° C.), 278 grams (0.24 equivalent) of a 40% oil solution of barium petroleum sulfonate, 77 grams (0.375 equivalent) of diisobutyl-phenol, 188 grams (2.45 equivalents) of BaO, 95 ml. of water, and 258 grams of low viscosity mineral oil were heated for one hour at 90°–100° C. The temperature of the process mass was raised to 150° C. and $CO_2$ was blown through the mass for 2 hours at 150° C. to render it substantially neutral on titre. Thereafter, the whole was heated an additional hour at 150° C. and filtered. The filtered end-product was a viscous, dark brown, oily liquid having the following analyses:

| | |
|---|---|
| Percent sulfur | 0.91 |
| Percent phosphorus | 0.48 |
| Percent barium | 14.3 |
| Percent sulfate ash (calculated) | 24.3 |
| Basic No | 5.9 |
| Metal ratio | 4.81 |

Example 43

678 grams (3.0 moles) of isononyl-phenol were heated to 180° C. and 510 grams (3.0 moles) of $PSCl_3$ were added thereto over a period of 10 hours at 180°–248° C. After the process mass had been stripped of volatile material at 180° C. under reduced pressure, it was steam-blown for one hour at 160°–205° C. and then dried at 185° C. and 40 mm. Hg absolute pressure. The residue (821 grams) was diluted with 450 grams of low viscosity mineral oil and filtered, yielding, as filtrate, a viscous, red-brown organo-phosphorus acid of undetermined composition having an acid number of 68.

250 grams (0.495 equivalent) of said acid, 1021 grams (0.794 equivalent) of a 35% oil solution of a mixture of equal molecular parts of barium di-isododecyl benzene sulfonate and barium petroleum sulfonate, 160 grams (0.776 equivalent) of diisobutyl-phenol, 426 grams (5.56 equivalents) of BaO, 997 grams of low viscosity mineral oil, and 215 ml. of water were stirred together for one hour at 90°–100° C. The temperature of the process mass was then elevated to 150° C. and $CO_2$ was blown through the mass for 2 hours at 150° C. to render it substantially neutral on titre. Thereafter the whole was heated an additional hour at 150° C. and filtered. The filtered end-product was a dark-brown, oil soluble liquid having the following analyses:

| | |
|---|---|
| Percent sulfur | 1.13 |
| Percent phosphorus | 0.13 |
| Percent barium | 10.9 |
| Percent sulfate ash (calculated) | 18.5 |
| Basic No | 9.0 |
| Metal ratio | 3.65 |

Example 44

The experiment described in Example 35 was repeated using 658 grams (0.45 equivalent) of barium white oil sulfonate in lieu of the 0.467 equivalent of mixed sulfonates specified therein. The end-product in this instance was a dark-brown, oil-soluble liquid having the following analyses:

| | |
|---|---|
| Percent sulfur | 1.03 |
| Percent phosphorus | 0.39 |
| Percent barium | 13.0 |
| Percent sulfate ash (calculated) | 22.1 |
| Basic No | 6.4 |
| Metal ratio | 4.39 |

Example 45

657 grams (0.45 equivalent) of barium white oil sulfonate, 548 grams (0.45 equivalent) of a 57% solution of barium di-isododecyl benzene sulfonate in mineral oil, 89 grams (ca. 0.1 equivalent) of the organo-phosphorus acid described in Example 30, 124 grams (0.60 equivalent) of diisobutyl-phenol, 310 grams (4.04 equivalents) of BaO, and 160 ml. of water were refluxed together for one hour at 90°–100° C. The temperature of the process mass was elevated to 150° C. and $CO_2$ was blown through it for 2 hours. Thereafter, the process mass was heated an additional hour at 150° C. and filtered. The filtered end-product was a dark brown, oil-soluble liquid having the following analyses:

| | |
|---|---|
| Percent sulfur | 1.81 |
| Percent phosphorus | 0.084 |
| Percent barium | 17.4 |
| Percent sulfate ash (calculated) | 29.6 |
| Basic No | 7.1 |
| Metal ratio | 4.61 |

Example 46

640 grams (2.0 moles) of chlorinated paraffin wax containing 12% chlorine were heated to 215° C. and 340 grams (2.0 moles) of $PSCl_3$ were added thereto over a 7-hour period at 215°–180° C. (temperature dropped on continued addition). 12 grams of dry, acid-activated clay ("Superfiltrol") were added and the whole was raised to 230° C. and held there for 3 hours, removing some unreacted $PSCl_3$ by distillation as the reaction progressed. The temperature of the process mass was elevated to 250° C. and a vacuum was applied to draw off any remaining $PSCl_3$. The residue was then steam-blown for 1.5 hours at 130°–155° C. and dried to 180° C. and 100 mm. Hg absolute pressure. The residue, a dark brown, liquid organo-phosphorus acid of undetermined structure, had an acid number of 101 and contained 5.3% sulfur, 6.64% phosphorus, and 2.96% chlorine.

180 grams (0.324 equivalent) of said acid, 1160 grams (1.0 equivalent) of a 40% oil solution of barium petroleum sulfonate, 165 grams (0.8 equivalent) of diisobutyl-phenol, 425 grams (5.55 equivalents) of BaO, and 300 ml. of water were refluxed for one hour at 90°–100° C. The temperature of the process mass was then elevated to 150° C. and $CO_2$ was blown through it for 2 hours to render it substantially neutral. Thereafter, the process mass was heated for an additional hour at 150° C. and filtered. The filtered end-product was a viscous, dark-brown, oil-soluble liquid having the following analyses:

| | |
|---|---|
| Percent sulfur | 2.17 |
| Percent phosphorus | 0.57 |
| Percent chlorine | 0.35 |
| Percent barium | 20.4 |
| Percent sulfate ash (calculated) | 34.6 |
| Basic No | 8.9 |
| Metal ratio | 4.55 |

Example 47

A product similar to that shown in Example 35 may be prepared by using 0.467 equivalent of barium white oil thiosulfonate in lieu of the 0.467 equivalent of mixed sulfonates specified therein.

Barium white oil thiosulfonate may be conveniently prepared by the reaction of white oil sulfonyl chloride (made according to the Reed process from white oil, $SO_2$, and chlorine) with an aqueous solution of an equivalent amount of BaS for 2 hours at 85°–100° C. and thereafter dehydrating the mass at 150° C. and filtering.

Example 48

A product similar to that shown in Example 35 may be prepared by using 0.467 equivalent of petroleum sulfinic acid in lieu of the 0.467 equivalent of mixed sulfonates specified therein.

Petroleum sulfinic acid may be prepared conveniently by the reduction at 50° C.–60° C. of petroleum sulfonyl chloride with 25% aqueous sodium sulfite in the presence of sufficient NaOH (added dropwise) to keep the pH of the process mass around 8.0. The sodium salt is thereby obtained which yields the acid on acidification with HCl.

Example 49

A product similar to that shown in Example 35 may be prepared by using 0.467 equivalent of lauryl-phenyl sulfenic acid in lieu of the 0.467 equivalent of mixed sulfonates specified therein.

Example 50

A product similar to that shown in Example 35 may be prepared by using 0.562 equivalent of tetralin sulfonic acid as a promoter in lieu of the 0.562 equivalent of diisobutyl-phenol specified therein.

Example 51

A product similar to that shown in Example 35 may be prepared by using 0.562 equivalent of acetyl-acetone as a promoter in lieu of the 0.562 equivalent of diisobutyl-phenol specified therein.

Example 52

A product similar to that shown in Example 35 may be prepared by using 0.562 equivalent of di-isopropyl dithiophosphoric acid as a promoter in lieu of the 0.562 equivalent of diisobutyl-phenol specified therein.

The salt complexes produced in accordance with the present invention can be employed in lubricants including oils and greases, and for such purposes as in crankcases, transmission, gears, etc. as well as in torque converter oils. Other suitable uses for such complexes are in asphalt emulsions, insecticidal compositions, fire-proofing and stabilizing agents in plasticizers and plastics, paint driers, rust inhibiting compositions, pesticides, foaming compositions, cutting oils, metal-drawing compositions, flushing oils, textile treatment compositions, tanning assistants, metal cleaning compositions, emulsifying agents, antiseptic cleansing compositions, penetrating agents, gum solvent compositions, fat splitting agents, bonding agent for ceramics and asbestos, asphalt improving agents, flotation agents, improving agents for hydrocarbon fuels such as e. g., gasoline and fuel oil, etc.

More particularly, the complexes of this invention are especially adapted for the preparation of lubricants, paint driers and plastics, particularly the halogen bearing plastics. In these respects, the salt complex can be employed in the following concentrations based upon the weight of the total composition.

|  | Broad Range, percent | Usual Range, percent | Preferred Range, percent |
|---|---|---|---|
| Lubricant | 0.01-20 | 0.2-15 | 0.5-10 |
| Stabilizing Agent for Plastics | 0.05-5 | 0.1-3 | 0.2-2 |
| Paint Drier | 0.2-25 | 0.5-20 | 1.0-15 |

LUBRICANT CONTAINING ORGANIC METAL COMPLEXES

While the metal complexes of the present invention are useful per se as improving agents for lubricating greases and oils, especially mineral lubricating oils intended for use in the crankcase of internal combustion engines, they are most advantageously employed in combination with one or more additional improving agents of the prior art such as, for example, the numerous prior art oxidation inhibitors, detergents, extreme pressure agents, rust inhibitors, and oiliness agents.

A more detailed description of additives which may be used with the products of the hereindescribed process to provide satisfactory lubricants may be found in U. S. Patent 2,723,234, column 36, line 25 through column 44, line 20.

As a consequence of a large number of tests performed on lubricants containing metal complexes of our invention, we have been able to determine the operable ranges of metal content and metal sulfate ash content (due to the presence of our complexes) for both lubricant improving agents and finished lubricants.

RANGES FOR WEIGHT PERCENT OF METAL SULFATE ASH AND METAL (DUE TO METAL COMPLEX) IN LUBRICANT IMPROVING AGENTS AND LUBRICANTS

|  | Range | | |
|---|---|---|---|
|  | broad, percent | intermediate, percent | preferred, percent |
| In lubricant improving agent: | | | |
| metal sulfate ash due to metal complex. | 0.38 to 40 | 0.64 to 30 | 1.28 to 20 |
| metal due to metal complex. | 0.07 to 23.5 | 0.13 to 17.5 | 0.27 to 12 |
| In lubricant: | | | |
| metal sulfate ash due to metal complex. | 0.002 to 8 | 0.005 to 6 | 0.01 to 4 |
| metal due to metal complex. | 0.001 to 5 | 0.0011 to 3.5 | 0.02 to 2.5 |

Diesel engines place heavy demands on the detergent or cleansing properties of a lubricant and these demands become progressively greater as the sulfur content of the fuel increases. Since a substantial proportion of the diesel fuels available to operators of diesel engines contain from 0.3 to 1% or more of sulfur in the form of naturally-occurring sulfur compounds, it is important to provide lubricants which will counteract the deleterious effect of such sulfur and maintain the engine in good mechanical condition by reducing the build-up of harmful deposits.

Metal complexes produced according to the teaching set forth in the instant application from a mixture of both (a) at least one sulfur acid or salt thereof, and (b) at least one phosphorus acid or salt thereof, have been found to be of particular utility in preparing improved lubricants for use in diesel engines, especially where such engines are operated on high sulfur content fuels.

In the diesel engine tests given hereinafter, certain additional improving agents of the oxidation and corrosion inhibition type were used in combination with the several metal complexes. For convenience, these have been designated as improving agents "A" and "B." Their composition is as follows:

"A"—Product prepared by reacting 4 moles of turpentine with 1 mole of $P_2S_5$ for about 4 hours at about 140° C.

"B"—A mixture of 40 mole-percent of zinc diisopropyl dithiophosphate with 60 mole-percent of zinc di-(4-methyl-sec-amyl) dithiophosphate.

In any given group of tests wherein two metal complexes are directly compared, it will be noted that each is present in an amount that imparts the same weight-percent of metal sulfate ash (and thus the same weight-percent of metal) to the lubricant. Since metal complexes of the instant application may vary considerably in metal content (and therefore metal sulfate ash content) valid test comparisons require that such metal complexes be compared when present on an equal weight-percent of metal sulfate ash in the lubricants.

I. *Buda diesel engine test.*—The diesel engine employed in this test is a single-cylinder, liquid-cooled engine which develops 7.5 brake-horsepower at 1800 R. P. M. It is manufactured by the Buda Company of Harvey, Illinois, and bears the designation Model 1–BD–38.

The following conditions were adhered to in testing lubricants in the Buda engine:

| | |
|---|---|
| Duration of test | 100 hours. |
| Load | 5 brake-horsepower. |
| Speed | 1800 R. P. M. |
| Fuel | Diesel fuel oil containing about 0.4% naturally occurring sulfur. |
| Fuel consumption | 3.05 lbs. per hour. |
| Lubricant temperature | 175° F. |
| Coolant temperature | 200° F. |

| Lubricant No. | Composition in SAE 30 solvent refined Mid-Continent motor oil (values are in weight-percent of the total lubricants) | Test Result | |
|---|---|---|---|
| | | Overall merit rating for piston [1] | Merit rating for carbonaceous deposits in top ring groove [2] |
| 1 | 0.71% sulfate ash as barium sulfonate-dithiophosphate (Ex. 1)—0.13% improving agent A—0.46% improving agent B. | 74.1 | 5.9 |
| 2 | 0.71% sulfate ash as barium sulfonate complex (see below for details of preparation)—0.13% improving agent A—0.46% improving agent B. | 61.2 | 4.6 |

[1] 100=perfectly clean.  [2] 10=perfectly clean.

The following is the details of preparation of the barium sulphonate complex present in lubricant No. 2 of the previous table.

1700 grams of a 30% oil solution of barium petroleum sulphonate (7.6% sulphate ash content) were admixed with 134 grams of diisobutyl-phenol (ratio of equivalents of sulphonate to diisobutyl-phenol is 1.7). The mass was heated to 70° C. and 800 ml. of water and 302 grams of barium oxide were added. After the reaction mass has been refluxed for one hour, the temperature was raised to 150° C. and held there for one hour.

Carbon dioxide was then passed through the mass for 38 minutes at a rate of 1,650 ml. per minute. Thereafter the contents of the reaction vessel were filtered to separate the sulphonate complex, which was brown, free-flowing, oil-soluble liquid having the following analyses:

| | |
|---|---|
| Basic No. | 5.05 |
| Percent sulphate ash | 26.0 |
| Metal ratio | 4.52 |

II. *Caterpillar diesel engine test of 480 hours duration.*—This test employs a single-cylinder diesel engine of 20 brake-horsepower manufactured by the Caterpillar Tractor Company of Peoria, Illinois. The engine, the character of the fuel employed (0.4% sulphur content), and the operating conditions adhered to in the test meet the requirements of U. S. Military Specification MIL-O-2104, paragraphs 4.3.4; 4.3.4.1; and 4.3.42. Detailed information concerning the actual test procedure is set forth in U. S. Army Ordnance Tentative Specification AXS-1551.

| Lube No. | Composition in SAE 30 solvent-extracted Alberta field motor oil (values are in weight-percent of the total lubricant) | Overall merit rating for piston [1] | Merit rating for carbonaceous deposits in top ring groove [2] | Merit rating for lacquer in grooves [2] | Merit rating for lacquer in lands [2] |
|---|---|---|---|---|---|
| 3 | 0.5% sulfate ash as barium complex prepared from a mixture of barium sulfonate and barium salt of a phosphorus acid of intermediate composition (Ex. 2)—0.45% improving agent B. | 97.2 | 9.3 | 10 | 10 |
| 4 | 0.5% sulfate ash as barium sulfonate complex (Same as in Lubricant No. 2 above) 0.45% improving agent B. | 61.6 | 8.5 | 1.5 | 2.0 |

[1] 100=perfectly clean.  [2] 10=perfectly clean.

III. *Caterpillar diesel engine test of 120 hours duration.*— This test is similar to that set forth in section II above, except that the fuel employed had a sulfur content of 1.0%. The heightened sulfur content of the fuel increases the severity of the test.

| Lube No. | Composition in SAE 30 solvent-extracted Mid-Continent motor oil (values are in weight-percent of the total lubricant) | Test Result | | | |
|---|---|---|---|---|---|
| | | Overall merit rating for piston [1] | Merit rating for carbonaceous deposits in top ring groove [2] | Merit rating for lacquer in grooves [2] | Merit rating for lacquer in lands [2] |
| 5 | 0.51% sulfate ash as barium complex prepared from a mixture of barium salt of a phosphorus acid of indeterminate composition (Ex. 2)—0.54% improving agent B. | 97.6 | 9.6 | 10 | 10 |
| 6 | 0.51% sulfate ash as barium sulfonate complex (Same as in Lubricant No. 2 above)—0.54% improving agent B. | 89.0 | 9.6 | 8.5 | 7.5 |

[1] 100=perfectly clean.  [2] 10=perfectly clean.

SPECIFIC EXAMPLES OF LUBRICANT IMPROVING AGENTS AND LUBRICANTS PREPARED USING THE METAL COMPLEXES OF THE PRESENT INVENTION

Certain oil-soluble phosphorous-and-sulfur-bearing organic materials used in many of the lubricant compositions illustrated herein are designated as follows (unless otherwise stated, percentages given are in weight-percent of total improving agent):

| Improving Agent | Description |
|---|---|
| A | product prepared by reacting about 4 moles of turpentine with about 1 mole of $P_2S_5$ for about 4 hours at 140° C.; 61% solution in low viscosity mineral oil. |
| B | zinc di-(4-methyl-sec-amyl) dithiophosphate; 44% solution in low viscosity mineral oil. |
| C | mixture of 60 mole-percent zinc di-(4-methyl-sec-amyl) dithiophosphate and 40 mole-percent zinc di-isopropyl dithiophosphate; 40% solution in low viscosity mineral oil. |
| D | barium salt of the mixed dithiophosphate diesters obtained by treating a mixture of 4-methyl-sec-amyl, n-hexyl, and capryl alcohols (3,2, and 3 parts by weight, respectively) with $P_2S_5$; 39% solution in low-viscosity mineral oil. |

For each of the specific lubricants shown hereinafter, the composition of the corresponding lubricant improving agent can be discerned by considering the weight percentages of the separate improving agents as parts by weight. For example, the lubricant improving agent corresponding to lubricant No. 7 would consists of 1 part by weight of improving agent B, plus 5 parts by weight of the complex of Example 17 (or 1.75 sulfate ash parts by weight thereof). If the separate improving agents do not themselves contain a proportion of mineral oil, some may be added, if necessary, to secure a fully liquid, multi-component "concentrate" as discussed earlier in the section regarding improving agent concentrates.

The values in parentheses ( ) in the percent column below give the percent of metal sulfate ash percent in the lubricant imparted by the amount and kind of metal complex employed therein.

| Lubricant Number | Composition (weight percent) | |
|---|---|---|
| | Percent | component |
| 7 | 94.0<br>5.0 (1.75)<br>1.0 | SAE 30 mineral oil.<br>metal complex of Example 17.<br>improving agent B. |
| 8 | 90.0<br>8.0 (2.82)<br>2.0 | SAE 30 mineral oil.<br>metal complex of Example 18.<br>improving agent C. |
| 9 | 92.52<br>5.3 (1.8)<br>0.28<br>0.98<br>0.92 | SAE 30 mineral oil.<br>metal complex of Example 19.<br>improving agent A.<br>improving agent C.<br>improving agent D. |
| 10 | 93.84<br>3.98 (1.46)<br>0.28<br>0.98<br>0.92 | SAE 30 mineral oil.<br>metal complex of Example 20.<br>improving agent A.<br>improving agent B.<br>improving agent D. |
| 11 | 97.13<br>1.47 (0.39)<br>0.25<br>1.15 | SAE 30 mineral oil.<br>metal complex of Example 21.<br>improving agent A.<br>improving agent B. |
| 12 | 96.83<br>1.65 (0.57)<br>0.2<br>0.88<br>0.44 | SAE 30 mineral oil.<br>metal complex of Example 22.<br>improving agent A.<br>improving agent B.<br>improving agent D. |
| 13 | 92.00<br>5.82 (1.96)<br>0.28<br>0.98<br>0.92 | SAE 30 mineral oil.<br>metal complex of Example 23.<br>improving agent A.<br>improving agent B.<br>improving agent D. |
| 14 | 93.94<br>3.88 (0.86)<br>0.28<br>0.98<br>0.92 | SAE 30 mineral oil.<br>metal complex of Example 24.<br>improving agent A.<br>improving agent B.<br>improving agent D. |
| 15 | 94.32<br>1.47<br>2.74 (0.62)<br>0.2<br>0.83<br>0.44 | SAE 30 mineral oil.<br>prior art viscosity index improver.<br>metal complex of Example 25.<br>improving agent A.<br>improving agent B.<br>improving agent D. |
| 16 | 95.28<br>1.47<br>1.78 (0.38)<br>0.2<br>0.83<br>0.44 | SAE 30 mineral oil.<br>prior art viscosity index improver.<br>metal complex of Example 26.<br>improving agent A.<br>improving agent B.<br>improving agent D. |
| 17 | 95.79<br>0.99<br>1.75 (0.73)<br>0.2<br>0.83<br>0.44 | SAE 20 mineral oil.<br>prior art viscosity index improver.<br>metal complex of Example 27.<br>improving agent A.<br>improving agent C.<br>improving agent D. |
| 18 | 96.35<br>1.85 (0.58)<br>0.14<br>1.2<br>0.46 | SAE 40 mineral oil.<br>metal complex of Example 28.<br>improving agent A.<br>improving agent B.<br>improving agent D. |
| 19 | 95.05<br>3.15 (1.11)<br>0.14<br>1.2<br>0.46 | SAE 40 mineral oil.<br>metal complex of Example 29.<br>improving agent A.<br>improving agent B.<br>improving agent D. |
| 20 | 96.08<br>2.12 (0.3)<br>0.14<br>1.2<br>0.46 | SAE 40 mineral oil.<br>metal complex of Example 30.<br>improving agent A.<br>improving agent B.<br>improving agent D. |
| 21 | 94.97<br>3.4 (0.63)<br>0.49<br>1.14<br>(1) | SAE 30 mineral oil.<br>metal complex of Example 31.<br>improving agent A.<br>improving agent C.<br>silicone anti-foam agent. |
| 22 | 94.44<br>3.38 (0.63)<br>0.28<br>0.98<br>0.92 | SAE 30 mineral oil.<br>metal complex of Example 32.<br>improving agent A.<br>improving agent B.<br>improving agent D. |
| 23 | 88.9<br>10.0 (1.52)<br>0.5<br>0.6 | SAE 10 mineral oil.<br>metal complex of Example 33.<br>zinc di-lauryl dithiophosphate.<br>P and S bearing product of Example 52. |
| 24 | 92.5<br>6.0 (0.84)<br>1.0<br>.5 | SAE 10 mineral oil.<br>metal complex of Example 34.<br>magnesium di-n-octyl dithiophosphate.<br>P and S bearing product of Example 74. |
| 25 | 84.0<br>15.0 (3.5)<br>0.3<br>0.7 | SAE 10 mineral oil.<br>metal complex of Example 35.<br>triamyl trithiophosphite.<br>P and S bearing product of Example 56. |
| 26 | 92.0<br>5.5 (1.75)<br>1.5 (0.35)<br>0.5<br>0.5 | SAE 20 mineral oil.<br>metal complex of Example 36.<br>metal complex of Example 35.<br>trilauryl trithiophosphate.<br>P and S bearing product of Example 68. |
| 27 | 95.0<br>4.0 (1.43)<br>0.8<br>0.2 | SAE 20 mineral oil.<br>metal complex of Example 37.<br>calcium di-n-decyl dithiophosphate.<br>P and S bearing product of Example 67. |
| 28 | 96.5<br>2.5 (0.69)<br>0.5<br>0.5 | SAE 20 mineral oil.<br>metal complex of Example 38.<br>zinc di-(lauryl-phenyl) dithiophosphinate.<br>P and S bearing product of Example 76. |
| 29 | 96.5<br>1.0 (0.34)<br>2.0 (0.55)<br>0.5 | SAE 20 mineral oil.<br>metal complex of Example 39.<br>metal complex of Example 38.<br>cobalt di-capryl dithiophosphate. |
| 30 | 97.5<br>2.0 (0.48)<br>.5 | SAE 20 mineral oil.<br>metal complex of Example 40.<br>P and S bearing product of Example 79. |
| 31 | 97.3<br>1.5 (0.35)<br>1.2 | SAE 30 mineral oil.<br>metal complex of Example 41.<br>improving agent C. |
| 32 | 93.3<br>6.0 (1.32)<br>0.5<br>0.2 | SAE 30 mineral oil.<br>metal complex of Example 44.<br>nickel di-octadecyl dithiophosphate.<br>P and S bearing product of Example 60. |
| 33 | 96.2<br>3.0 (1.49)<br>0.5<br>0.3 | SAE 30 mineral oil.<br>metal complex of Example 5.<br>tri-(tert-butyl-phenyl) dithiophosphate.<br>P and S bearing product of Example 65. |
| 34 | 91.5<br>8.0 (2.45)<br>0.5 | SAE 30 mineral oil.<br>metal complex of Example 9.<br>P and S bearing product of Example 80. |
| 35 | 95.25<br>4.0 (1.75)<br>0.75 | SAE 30 mineral oil.<br>metal complex of Example 11.<br>improving agent A. |
| 36 | 98.3<br>0.2 (0.052)<br>1.5 | SAE 30 mineral oil.<br>metal complex of Example 12.<br>improving agent C. |
| 37 | 81.0<br>15.0 (4.6)<br>2.0<br>2.0 | SAE 30 mineral oil.<br>metal complex of Example 15.<br>zinc di-(methyl-cyclohexyl) dithiophosphate.<br>P and S bearing product of Example 69. |

[1] 2 parts per million.

Other modes of applying the principle of the invention may be employed, change being made as regards the details described, provided the features stated in any of the following claims, or the equivalent of such, be employed.

We therefore particularly point out and distinctly claim as our invention:

1. A process which comprises preparing and mixing a mass in which, at 50° C., at least 50% of the components are in the liquid state, and in which mass the active components consist of:

A. A mixture of:
(i) At least one oil-soluble organic acid compound having at least 12 carbon atoms in the molecule selected from the class consisting of aliphatic and cyclic sulphur acids and the salts thereof; and,
(ii) At least one oil-soluble organic acid compound having at least 12 carbon atoms in the molecule selected from the class consisting of the aliphatic and cyclic phosphorus acids and the salts thereof; the ratio of equivalents of (i) to (ii) being from 0.10 to 10;

B. An organic compound selected from the class consisting of organic salt-forming compounds and the salts thereof, said organic compounds having—
(i) An ionization constant in water of at least about $1 \times 10^{-10}$ at about 25° C.;
(ii) A water solubility at 50° C. of at least about 0.0005%; and
(iii) In saturated aqueous solutions at about 25° C. a pH of less than 7;
the relative total amount of A and B used being in the range of from about one equivalent of the total amount of A to about 10 equivalents of B to about 10 equivalents of the total amount of A to about one equivalent of B;

C. A basically reacting metal compound;
(i) Which is water-soluble at a temperature of 50° C. to the extent of at least about 0.0003%;
(ii) In an amount such that there are present in the mass substantially more than 1 equivalent of metal, including the metal present in the remaining components, per equivalent of A plus B; and D. Water, in an amount equal to at least about one-tenth mole per mole of C;

maintaining the mass at a temperature and for a period of time sufficient to drive off substantially all free water and water of hydration which may be present, and form the organic metal complex.

2. The process of claim 1 further characterized in that said process mass is treated prior to filtration with an acidic material of which the ionization constant is higher than the ionization constant of the organic salt-forming compound of component B and in amounts sufficient to liberate a substantial proportion of said organic compound of component B.

3. The process of claim 1 further characterized in that component A (ii) is at least one phosphorus compound prepared by reacting an unsaturated compound with a phosphorus sulfide.

4. The process of claim 1 further characterized in that component A (ii) is at least one phosphorus acid compound prepared by reacting at least one unsaturated compound with a phosphorus sulfide and with sulfur.

5. The process of claim 1 further characterized in that component A(i) is at least one petroleum sulfonic acid and component A (ii) is at least one phosphorus acid having more than 12 carbon atoms.

6. The process of claim 1 further characterized in that component A (i) is at least one mahogany sulfonic acid and component A (ii) is at least one phosphorus acid having more than 12 carbon atoms.

7. The process of claim 1 further characterized in that component A (i) is at least one alkyl benzene sulfonic acid and component A (ii) is at least one phosphorus acid having more than 12 carbon atoms.

8. The process of claim 1 further characterized in that component A (i) is at least one sulfur acid having more than 12 carbon atoms; component A (ii) is at least one phosphorus acid having more than 12 carbon atoms and component B is at least one phenolic compound.

9. The process of claim 1 further characterized in that component A (i) is at least one sulfur acid having more than 12 carbon atoms; component A (ii) is at least one phosphorus acid having more than 12 carbon atoms and component C is at least one basically-reacting metal compound of which the metal is selected from the class consisting of metals of group I having an atomic weight less than 40 and the metals of group II having an atomic weight less than 138.

10. The process of claim 1 further characterized in that component A (i) is at least one sulfur acid having more than 12 carbon atoms; component A (ii) is at least one phosphorus acid having more than 12 carbon atoms and component C is at least one basically-reacting alkaline earth metal compound.

11. The process of claim 1 further characterized in that component A (i) is at least one sulfur acid having more than 12 carbon atoms; component A (ii) is at least one phosphorus acid having more than 12 carbon atoms and component C is at least one basically-reacting barium compound.

12. The process of claim 1 further characterized in that component A (i) is at least one sulfur acid having more than 12 carbon atoms; component A (ii) is at least one phosphorus acid having more than 12 carbon atoms and in which the process mass is further treated prior to filtration with $CO_2$ in amounts sufficient to liberate a substantial proportion of said organic compounds of component B.

13. The process of claim 1 further characterized in that component A (i) is a mixture of petroleum mahogany sulfonic acid compounds and at least one alkyl aromatic sulfonic acid compound.

14. The product in accordance with the process of claim 1.

References Cited in the file of this patent

UNITED STATES PATENTS

| | | |
|---|---|---|
| 2,418,894 | McNab et al. | Apr. 15, 1947 |
| 2,491,649 | Duncan et al. | Dec. 20, 1949 |
| 2,616,904 | Asseff et al. | Nov. 4, 1952 |
| 2,616,905 | Asseff et al. | Nov. 4, 1952 |
| 2,616,911 | Asseff et al. | Nov. 4, 1952 |
| 2,616,924 | Asseff et al. | Nov. 4, 1952 |
| 2,616,925 | Asseff et al. | Nov. 4, 1952 |
| 2,617,049 | Asseff et al. | Nov. 4, 1952 |